(12) United States Patent
Sawada et al.

(10) Patent No.: US 10,906,008 B2
(45) Date of Patent: Feb. 2, 2021

(54) PROTECTIVE-LAYER-COVERED GAS SEPARATION MEMBRANE, METHOD FOR PRODUCING PROTECTIVE-LAYER-COVERED GAS SEPARATION MEMBRANE, GAS SEPARATION MEMBRANE MODULE, AND GAS SEPARATION APPARATUS

(71) Applicant: FUJIFILM Corporation, Tokyo (JP)

(72) Inventors: Makoto Sawada, Kanagawa (JP);
Satoshi Yoneyama, Kanagawa (JP);
Yusuke Mochizuki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 197 days.

(21) Appl. No.: 15/993,600

(22) Filed: May 31, 2018

(65) Prior Publication Data
US 2018/0272291 A1     Sep. 27, 2018

Related U.S. Application Data

(63) Continuation of application No. PCT/JP2016/080238, filed on Oct. 12, 2016.

(30) Foreign Application Priority Data

Dec. 10, 2015  (JP) .................. 2015-241518

(51) Int. Cl.
*B01D 69/12*     (2006.01)
*B01D 69/02*     (2006.01)
(Continued)

(52) U.S. Cl.
CPC ........... *B01D 69/127* (2013.01); *B01D 53/22* (2013.01); *B01D 53/228* (2013.01);
(Continued)

(58) Field of Classification Search
CPC .... B01D 53/22; B01D 53/228; B01D 67/009; B01D 69/02; B01D 69/10; B01D 69/12;
(Continued)

(56) References Cited

U.S. PATENT DOCUMENTS

| | | | | |
|---|---|---|---|---|
| 4,813,983 | A * | 3/1989 | Nohmi | B01D 69/12 428/378 |
| 10,427,111 | B2 * | 10/2019 | Mochizuki | B01D 71/70 |

(Continued)

FOREIGN PATENT DOCUMENTS

| | | |
|---|---|---|
| EP | 0174918 | 3/1986 |
| JP | S60139316 | 7/1985 |

(Continued)

OTHER PUBLICATIONS

Matsuyama, Hideto et al., "Effect of plasma treatment on CO2 permeability and selectivity of poly(dimethylsiloxane) membrane", Journal of Membrane Science, 99, 1995, pp. 139-147. (Year: 1995).*

(Continued)

*Primary Examiner* — Jason M Greene
(74) *Attorney, Agent, or Firm* — JCIPRNET

(57) ABSTRACT

A protective-layer-covered gas separation membrane has a gas separation membrane that satisfies specific conditions such as having a resin layer containing a compound having a siloxane bond, a protective layer located on the resin layer containing a compound having a siloxane bond of the gas separation membrane, and a porous layer on the protective layer. The protective-layer-covered gas separation membrane is produced. A gas separation membrane module and a gas separation apparatus have the protective-layer-covered gas separation membrane.

10 Claims, 5 Drawing Sheets

(51) Int. Cl.
   *B01D 71/70* (2006.01)
   *B01D 53/22* (2006.01)
   *B32B 9/00* (2006.01)
   *B01D 67/00* (2006.01)
   *B01D 71/64* (2006.01)

(52) U.S. Cl.
   CPC ....... *B01D 67/0006* (2013.01); *B01D 67/009* (2013.01); *B01D 67/0088* (2013.01); *B01D 69/02* (2013.01); *B01D 69/12* (2013.01); *B01D 71/64* (2013.01); *B01D 71/70* (2013.01); *B32B 9/00* (2013.01); *B01D 2257/504* (2013.01); *B01D 2258/025* (2013.01); *B01D 2258/0233* (2013.01); *B01D 2258/0283* (2013.01); *B01D 2258/05* (2013.01); *B01D 2323/34* (2013.01); *B01D 2323/345* (2013.01); *B01D 2323/46* (2013.01); *B01D 2325/04* (2013.01)

(58) Field of Classification Search
   CPC .... B01D 69/125; B01D 69/127; B01D 71/64; B01D 71/70; B01D 2257/504
   See application file for complete search history.

(56) References Cited

U.S. PATENT DOCUMENTS

| | | |
|---|---|---|
| 2003/0207099 A1 | 11/2003 | Gillmor et al. |
| 2005/0103193 A1 | 5/2005 | Lyons et al. |
| 2011/0261112 A1 | 10/2011 | Okamura |
| 2014/0208949 A1 | 7/2014 | Ishizuka et al. |
| 2014/0345462 A1 | 11/2014 | Itou |
| 2016/0263531 A1 | 9/2016 | Odeh et al. |
| 2016/0354731 A1 | 12/2016 | Mochizuki |
| 2017/0341017 A1 | 11/2017 | Dutta et al. |
| 2018/0178166 A1* | 6/2018 | Okubo .................. B01D 69/12 |
| 2019/0291060 A1* | 9/2019 | Mochizuki ............ B01D 69/02 |

FOREIGN PATENT DOCUMENTS

| | | |
|---|---|---|
| JP | S6154222 | 3/1986 |
| JP | H038808 | 2/1991 |
| JP | H04305238 | 10/1992 |
| JP | H05137983 | 6/1993 |
| JP | H06126138 | 5/1994 |
| JP | H11169689 | 6/1999 |
| JP | 2010240622 | 10/2010 |
| JP | 2013075264 | 4/2013 |
| JP | 2013166131 | 8/2013 |
| JP | 2015134310 | 7/2015 |
| JP | 2015160201 | 9/2015 |
| JP | 2015163386 | 9/2015 |

OTHER PUBLICATIONS

Matsuyama, Hideto et al., "Effect of plasma treatment on CO2 permeability and selectivity of poly (dimethylsiloxane) membrane," Journal of Membrane Science, vol. 199, Issue 2, Feb. 28, 1995, pp. 139-147.
Taisuke Maki et al., "Effect of Atmospheric Glow Discharge Plasma Treatment on CO 2 Permeability and Chemical Structure of Poly(dimethylsiloxane) Membranes," ACS Symposium Series, Sep. 1999, pp. 135-148.
"Office Action of Japan Related Application No. 2015-146306", dated May 23, 2017, pp. 1-4.
"Office Action of Japan Related Application No. 2015-146307", dated May 23, 2017, pp. 1-8.
"Office Action of Japan Related Application No. 2015-146308", dated May 23, 2017, pp. 1-6.
International Preliminary Report on Patentability dated Apr. 13, 2017, with English translation of "Written Opinion of the International Searching Authority (Form PCT/ISA/237) of PCT/JP2015/075187," pp. 1-10.
Jung-Tsai Chen et al., "Surface modification of poly(dimethylsiloxane) by atmospheric pressure high temperature plasma torch to prepare high-performance gas separation membranes," Journal of Membrane Science, vol. 440, Aug. 1, 2013, pp. 1-8.
"International Search Report (Form PCT/ISA/210) of PCT/JP2015/075187," dated Oct. 27, 2015, with English translation thereof, pp. 1-5.
"Office Action of U.S. Appl. No. 15/458,407", dated Feb. 11, 2019, pp. 1-19.
Hideto Matsuyama, et al., "Effect of plasma treatment on CO2 permeability and selectivity of poly(dimethylsiloxane) membrane," Journal of Membrane Science, vol. 99, Issue 2, Feb. 28, 1995, pp. 139-147.
Jung-Tsai Chen, et al., "Surface modification of poly(dimethylsiloxane) by atmospheric pressure high temperature plasma torch to prepare high-performance gas separation membranes," Journal of Membrane Science, vol. 440, Apr. 6, 2013, pp. 1-8.
Yuichi Hirata (Chapter 1, Section 2), and Kenji Kano (Chapter 1, Section 3), pp. 13-27, particularly pp. 13-15 of "Advances in Barrier Technologies—Current Technology and New Development for Barrier Film, Barrier Container, Encapsulants and Sealing Materials—", published on Apr. 1, 2007, with English introduction.
"International Search Report (Form PCT/ISA/210) of PCT/JP2016/080238," dated Nov. 22, 2016, with English translation thereof, pp. 1-5.
"Written Opinion of the International Searching Authority (Form PCT/ISA/237) of PCT/JP2016/080238," dated Nov. 22, 2016, with English translation thereof, pp. 1-16.
"Office Action of Japan Counterpart Application," with English translation thereof, dated Jul. 2, 2019, p. 1-p. 9.

* cited by examiner

PROTECTIVE-LAYER-COVERED GAS SEPARATION MEMBRANE, METHOD FOR PRODUCING PROTECTIVE-LAYER-COVERED GAS SEPARATION MEMBRANE, GAS SEPARATION MEMBRANE MODULE, AND GAS SEPARATION APPARATUS

CROSS-REFERENCE TO RELATED APPLICATIONS

This application is a Continuation of PCT International Application No. PCT/JP2016/080238, filed on Oct. 12, 2016, which claims priority under 35 U.S.C. § 119(a) to Japanese Patent Application No. 2015-241518, filed on Dec. 10, 2015. Each of the above application(s) is hereby expressly incorporated by reference, in its entirety, into the present application.

BACKGROUND OF THE INVENTION

1. Field of the Invention

The present invention relates to a protective-layer-covered gas separation membrane, a method for producing a protective-layer-covered gas separation membrane, a gas separation membrane module, and a gas separation apparatus. More particularly, the invention relates to a protective-layer-covered gas separation membrane having good initial gas permeation performance, good abrasion resistance, and good bending resistance, a method for producing such a protective-layer-covered gas separation membrane, a gas separation membrane module including such a protective-layer-covered gas separation membrane, and a gas separation apparatus including such a gas separation membrane module.

2. Description of the Related Art

Materials made of polymer compounds have gas permeability specific to each material. Due to this nature, selective permeation and separation of a gas component of interest can be achieved by using a membrane (gas separation membrane) formed of a particular polymer compound. As an industrial application of such gas separation membranes, separation and recovery of carbon dioxide from its large sources in thermal power plants, cement plants, blast furnaces at iron mills, and other facilities have been studied in relation to the issue of global warming. This membrane separation technique has been attracting attention as means for solving environmental problems with relatively low energy and has been mainly used as means for removing carbon dioxide from natural gas and biogas (gases generated by fermentation or anaerobic digestion of excrement from organisms, organic fertilizers, biodegradable substances, sewage, garbage, energy crops, and other substances), which contain methane and carbon dioxide.

To provide a practical gas separation membrane, a part that contributes to gas separation is formed as a thin layer to ensure gas permeability and gas separation selectivity. Examples of known methods for achieving this include the following: the use of an asymmetric membrane in which a part that contributes to separation is formed as a thin layer referred to as a skin layer; the use of a thin film composite in which a thin film layer (selective layer) that contributes to gas separation is disposed on a support having mechanical strength; and the use of a hollow fiber membrane including a high-density layer that contributes to gas separation.

Examples of representative properties of gas separation membranes include gas separation selectivity for obtaining a gas of interest from a mixed gas and gas permeability for the gas of interest. In particular, to increase gas permeability and gas separation selectivity, gas separation membranes having various configurations have been studied.

For example, JP1986-54222A (JP-S61-54222A) describes a method for increasing gas separation selectivity, for example, for a mixed gas of carbon dioxide and methane by using a gas separation membrane including a porous support, a non-porous interlayer disposed on the porous support and containing a compound having a siloxane bond, and a layer disposed on the non-porous interlayer and containing cellulose triacetate or polyimide.

JP1985-139316A (JP-S60-139316A) describes a method for producing a gas separation layered composite membrane having high selectivity (gas separation selectivity), the method including performing low-temperature plasma treatment with a non-polymerizable gas on a surface of a gas separation composite membrane, and then forming, on the plasma-treated surface, a thin film of a silicon-containing polymer such as a compound having a siloxane bond. This literature discloses a polydimethylsiloxane membrane as an example of the gas separation composite membrane subjected to the low-temperature plasma treatment. This literature also discloses argon as an example of the non-polymerizable gas used in the low-temperature plasma treatment. In all examples described in this literature, the low-temperature plasma treatment is performed using argon gas as a non-polymerizable gas on a surface of a gas separation composite membrane made of a polydimethylsiloxane copolymer.

JP1991-8808B (JP-H03-8808B) describes a composite membrane including a polymer porous support, a thin film disposed on the polymer porous support and made of a siloxane compound having a specific structure, and a plasma polymerized film disposed on the thin film. Only a surface layer of the thin film made of a siloxane compound is plasma-treated with a non-polymerizable gas. This literature disclosed that a composite membrane having such a configuration has excellent selective gas permeability (high gas separation selectivity and high gas permeability).

JP2013-75264A describes a method for producing a thin film composite that has a support and a layer having separation selectivity and made of polydimethylsiloxane or other resin, the method including forming, on the surface of the layer having separation selectivity, a hydrophilically modified surface layer having a thickness of 0.1 μm or less by performing, for example, ultraviolet (UV) ozone irradiation treatment, followed by silane coupling agent treatment.

Journal of Membrane Science 1995, Vol. 99, pp. 139-147 shows that by treating a surface of a membrane made of a polyimide support and polydimethylsiloxane at a low power of 5 W or less for a period of time on the order of minutes (120 seconds), the permeability ratio of carbon dioxide to methane under atmospheric pressure 30 minutes after the treatment is increased compared to that of the original polydimethylsiloxane, but high gas separation selectivity is not provided.

Journal of Membrane Science 2013, Vol. 440, pp. 1-8 discloses that by treating a surface of a polydimethylsiloxane membrane with atmospheric-pressure high-temperature plasma, the ratio of oxygen atoms to silicon atoms in the surface is increased to 1.6, but high gas separation selectivity is not provided.

In the field of gas separation membranes, it is known that according to a general layered model, a layered structure decreases gas permeability as in the case of a series connection of resistors in an electric circuit (see pp. 13 to 27, particularly pp. 13 to 15, of "Advances in Barrier Technologies—Current Technology and New Development for Barrier Film, Barrier Container, Encapsulants and Sealing Materials—", Chapter 1, Section 2, Yuichi Hirata, Section 3, Kenji Kano). Therefore, a layered structure in which a layer having separation selectivity is disposed as the outermost layer of a gas separation membrane and no functional layer is disposed outside the layer having separation selectivity has been considered to be preferred from the viewpoint of permeation performance.

SUMMARY OF THE INVENTION

However, the inventors have examined the performance of the gas separation membranes described in the above literatures and have found that their gas permeation performance may be low in some cases. In particular, it has been found that after a resin layer containing a compound having a siloxane bond is obtained by performing surface oxidation treatment, defects occur during the winding of the gas separation membrane, thus decreasing the gas permeation performance. Furthermore, it has been found that even if the gas separation membrane is not wound, the gas permeation performance is decreased simply by touching with a finger the surface of the resin layer containing a compound having a siloxane bond.

It was also found that the gas permeation performance is deteriorated simply by bending the gas separation membrane in modularizing the gas separation membrane, for example, into a spiral-wound module and that after modularization, rubbing of the gas separation membrane against other members such as a supporting member inner portion the module in operation also causes defects to deteriorate the gas permeation performance.

An object of the present invention is to provide a protective-layer-covered gas separation membrane having good initial gas permeation performance, good abrasion resistance, and good bending resistance.

The inventors have intensively studied the cause of the deterioration of initial gas permeation performance, abrasion resistance, and bending resistance and have found that the surface of a resin layer containing a compound having a siloxane bond and obtained by performing surface oxidation treatment is much more brittle than those of conventionally known resin layers such as resin layers containing a compound having a siloxane bond and not subjected to surface oxidation treatment and other layers having separation selectivity, such as polyimide layers.

The inventors have further conducted intensive studies and have found that providing a protective layer and a porous layer on the surface of the resin layer containing a compound having a siloxane bond and obtained by performing surface oxidation treatment reduces the deterioration of the gas permeation performance and thus improves the initial performance at an early stage. The inventors have also found that after the protective layer and the porous layer are provided, the abrasion resistance and bending resistance improve without any significant decrease in gas permeation performance.

Such protective layers have previously not been provided because it has been expected that such protective layers, when provided on resin layers containing a compound having a siloxane bond and not subjected to surface oxidation treatment or on other layers having separation selectivity, such as polyimide layers, cannot improve the initial gas permeation performance, abrasion resistance, and bending resistance but rather reduce the gas permeability because of the layered structure. In addition, for conventional gas separation membranes, providing a porous layer together with a protective layer has not been studied as a matter of course.

The present invention and preferred embodiments thereof provide the following specific means for solving the foregoing problem.

[1] A protective-layer-covered gas separation membrane including:
a gas separation membrane including a resin layer containing a compound having a siloxane bond;
a protective layer located on the resin layer; and
a porous layer on the protective layer,
wherein the gas separation membrane satisfies one of conditions 1, 3, and 4:
condition 1: the resin layer satisfies inequalities 1 and 2:
inequality 1: $0.9 \geq A/B \geq 0.55$
inequality 2: $B \geq 1.7$
wherein A represents an O/Si ratio that is a ratio of the number of oxygen atoms to the number of silicon atoms contained in the resin layer at a depth of 10 nm from a surface of the resin layer, and B represents an O/Si ratio that is a ratio of the number of oxygen atoms to the number of silicon atoms in the surface of the resin layer;
condition 3: a minimum percentage $Si_0$ of $Si^{2+}$ and $Si^{3+}$ peaks relative to all Si peaks in ESCA depth profiling of the resin layer is 1% to 40%; and
condition 4: a positron lifetime $\tau 3$ of a third component formed by implantation of a positron with an energy of 1 keV into the surface of the resin layer is 3.40 to 4.20 ns.
[2] The gas separation membrane according to [1] preferably has a porous support A and the resin layer disposed on the porous support A and satisfies condition 2:
condition 2: the compound having a siloxane bond has a repeating unit represented by general formula (2) and a repeating unit represented by general formula (3):

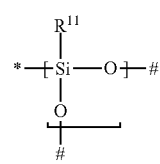

general formula (2)

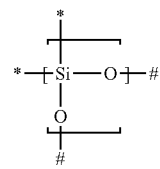

general formula (3)

wherein $R^{11}$ represents a substituent, * represents a site linked to # in general formula (2) or (3), and # represents a site linked to * in general formula (2) or (3),
the gas separation membrane includes a region GLi where the compound having a siloxane bond is present in the porous support A and a region GLe where the resin layer is present on the porous support A,
GLe has a thickness of 50 to 1,000 nm,
GLi has a thickness of 20 nm or more, and the thickness of GLi is 10% to 350% of the thickness of GLe, and a difference between a content of the repeating unit represented by general formula (3) in a surface layer of GLe extending to a depth of 20 nm and a content of the repeating unit represented by general formula (3) in a surface layer of GLi extending to a depth of 20 nm is 30% to 90%.

[3] In the protective-layer-covered gas separation membrane according to [1] or [2], the protective layer preferably includes a region PLi present in the porous layer and a region PLe present on the porous layer, and a degree of infiltration of the protective layer into the porous layer is preferably 10% to 90%, the degree of infiltration being expressed by the following formula:

degree of infiltration of protective layer into porous layer=100%×(thickness of PLi)/(thickness of PLi+thickness of PLe).

[4] In the protective-layer-covered gas separation membrane according to any one of [1] to [3], the protective layer preferably contains a silicone resin.

[5] In the protective-layer-covered gas separation membrane according to [4], the silicone resin preferably contains a $Si^{4+}$ component.

[6] In the protective-layer-covered gas separation membrane according to any one of [1] to [5], the protective layer preferably has a thickness of 200 to 3,000 nm.

[7] In the protective-layer-covered gas separation membrane according to any one of [1] to [6], the resin layer of the gas separation membrane and the protective layer are preferably adjacent to each other.

[8] A method for producing a protective-layer-covered gas separation membrane according to any one of [1] to [7], the method including the step of:

laminating a layered body of the porous layer and the protective layer to the resin layer of the gas separation membrane.

[9] A gas separation membrane module having the protective-layer-covered gas separation membrane according to any one of [1] to [7].

[10] A gas separation apparatus having the gas separation membrane module according to [9].

The following protective-layer-covered gas separation membrane is also preferred and can solve the problem to be solved by the present invention.

[0] A protective-layer-covered gas separation membrane including:

a gas separation membrane including a resin layer containing a compound having a siloxane bond;

a protective layer located on the resin layer; and a porous layer on the protective layer, wherein the gas separation membrane satisfies one of conditions 1 to 4:

condition 1: the resin layer satisfies inequalities 1 and 2:

inequality 1: 0.9≥A/B≥0.55 inequality 2: B≥1.7 wherein A represents an O/Si ratio that is a ratio of the number of oxygen atoms to the number of silicon atoms contained in the resin layer at a depth of 10 nm from a surface of the resin layer, and B represents an O/Si ratio that is a ratio of the number of oxygen atoms to the number of silicon atoms in the surface of the resin layer;

condition 2: the compound having a siloxane bond has a repeating unit represented by general formula (2) and a repeating unit represented by general formula (3):

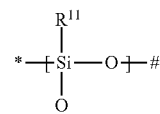

general formula (2)

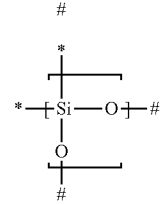

general formula (3)

wherein $R^{11}$ represents a substituent, * represents a site linked to # in general formula (2) or (3), and # represents a site linked to * in general formula (2) or (3), the gas separation membrane includes a region GLi where the compound having a siloxane bond is present in the porous support A and a region GLe where the resin layer is present on the porous support A, GLe has a thickness of 50 to 1,000 nm, GLi has a thickness of 20 nm or more, and the thickness of GLi is 10% to 350% of the thickness of GLe, and a difference between a content of the repeating unit represented by general formula (3) in a surface layer of GLe extending to a depth of 20 nm and a content of the repeating unit represented by general formula (3) in a surface layer of GLi extending to a depth of 20 nm is 30% to 90%;

condition 3: a minimum percentage $Si_0$ of $Si^{2+}$ and $Si^{3+}$ peaks relative to all Si peaks in ESCA depth profiling of the resin layer is 1% to 40%; and condition 4: a positron lifetime τ3 of a third component formed by implantation of a positron with an energy of 1 keV into the surface of the resin layer is 3.40 to 4.20 ns.

The gas separation membrane satisfies one of conditions 1 to 4 and may satisfy more than one of conditions 1 to 4.

In this specification, if a plurality of substituents, a plurality of linking groups, or the like (hereinafter referred to as "substituents or the like") are represented by a particular symbol or if a plurality of substituents or the like are simultaneously or alternatively defined, it is meant that the substituents or the like may be the same or different. Furthermore, if a plurality of substituents or the like are close to each other, they may be linked or fused to each other to form a ring even if not explicitly stated.

In this specification, the designations of compounds (including resins) are meant to include the compounds themselves, salts thereof, and ions thereof. These designations are also meant to include derivatives in which a certain portion is altered, provided that the desired effect is produced.

It is meant in this specification that substituents (and linking groups) may have any substituent, provided that the desired effect is produced. This also applies to compounds that are not explicitly designated as substituted or unsubstituted.

According to the present invention, a protective-layer-covered gas separation membrane having good initial gas permeation performance, good abrasion resistance, and good bending resistance, can be provided.

DESCRIPTION OF THE PREFERRED EMBODIMENTS

Figure 1:
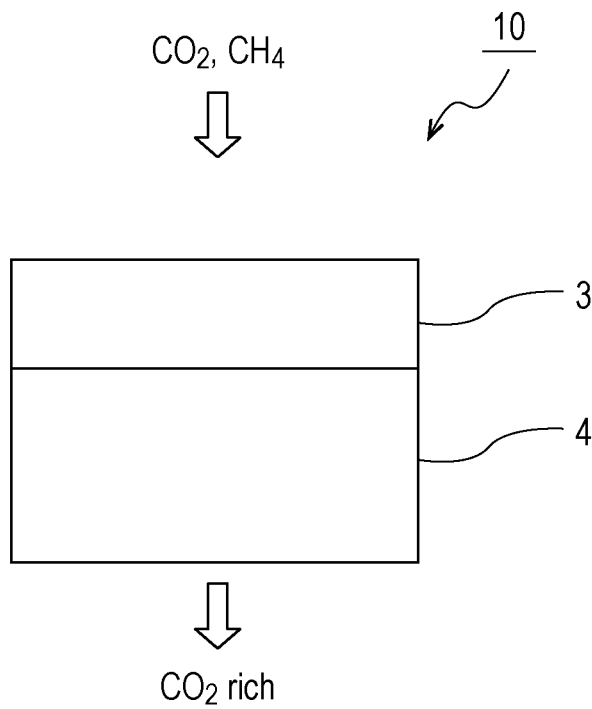
FIG. 1 is a schematic view of an exemplary gas separation membrane used in the present invention.

The present invention will now be described in detail. It should be appreciated that although the following description of features may be made in the context of a representative embodiment of the present invention, the present invention is not limited to the embodiment. Every numerical range expressed as " . . . to . . . " throughout this specification means a range including the numerical values before and after "to" as the upper and lower limits.

Protective-Layer-Covered Gas Separation Membrane

A protective-layer-covered gas separation membrane according to the present invention has:

a gas separation membrane including a resin layer (hereinafter also referred to as a specific resin layer) containing a compound having a siloxane bond;

a protective layer located on the resin layer; and a porous layer on the protective layer.

The gas separation membrane satisfies one of conditions 1, 3, and 4:

condition 1: the resin layer satisfies inequalities 1 and 2:
inequality 1: $0.9 \geq A/B \geq 0.55$
inequality 2: $B \geq 1.7$ wherein A represents an O/Si ratio that is a ratio of the number of oxygen atoms to the number of silicon atoms contained in the resin layer at a depth of 10 nm from a surface of the resin layer, and B represents an O/Si ratio that is a ratio of the number of oxygen atoms to the number of silicon atoms in the surface of the resin layer;

condition 3: a minimum percentage $Si_0$ of $Si^{2+}$ and $Si^{3+}$ peaks relative to all Si peaks in ESCA depth profiling of the resin layer is 1% to 40%;

condition 4: a positron lifetime τ3 of a third component formed by implantation of a positron with an energy of 1 keV into the surface of the resin layer is 3.40 to 4.20 ns.

The protective-layer-covered gas separation membrane according to the present invention preferably has a porous support A and the resin layer disposed on the porous support A and satisfies condition 2:

condition 2: the compound having a siloxane bond has a repeating unit represented by general formula (2) and a repeating unit represented by general formula (3):

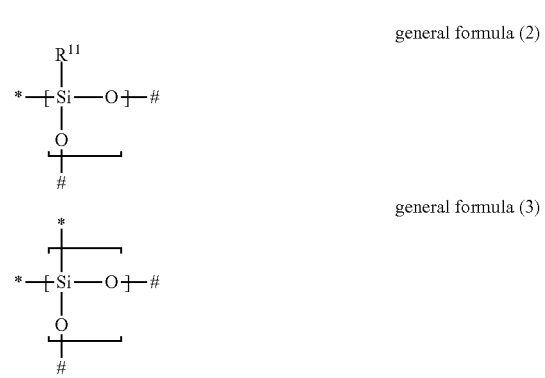

wherein $R^{11}$ represents a substituent, * represents a site linked to # in general formula (2) or (3), and # represents a site linked to * in general formula (2) or (3), the gas separation membrane includes a region GLi where the compound having a siloxane bond is present in the porous support A and a region GLe where the resin layer is present on the porous support A, GLe has a thickness of 50 to 1,000 nm, GLi has a thickness of 20 nm or more, and the thickness of GLi is 10% to 350% of the thickness of GLe, and a difference between a content of the repeating unit represented by general formula (3) in a surface layer of GLe extending to a depth of 20 nm and a content of the repeating unit represented by general formula (3) in a surface layer of GLi extending to a depth of 20 nm is 30% to 90%.

With this configuration, the protective-layer-covered gas separation membrane according to the present invention has good initial gas permeation performance, good abrasion resistance, and good bending resistance. By providing the protective layer, accidental contact between the specific resin layer and other materials can be prevented during handling, for example, during a step of winding the gas separation membrane subjected to surface oxidation treatment into a roll, or during use. As a result, the initial gas permeation performance and abrasion resistance can be improved. In particular, it has previously been expected that a layered structure formed by providing a protective layer on a gas separation membrane reduces the gas permeability, as described in "Advances in Barrier Technologies—Current Technology and New Development for Barrier Film, Barrier Container, Encapsulants and Sealing Materials—", Chapter 1, Section 2, Yuichi Hirata, Section 3, Kenji Kano. In contrast, in the present invention, the initial gas permeation performance (initial performance) can be improved by providing a protective layer, as compared to the case where no protective layer is provided. It has not been known that a specific resin layer is so brittle as to deteriorate during a film formation process in a common production apparatus. Thus, the improvement in initial gas permeation performance (initial performance) is an unpredictable effect for those skilled in the art.

Furthermore, since the protective-layer-covered gas separation membrane according to the present invention has the porous layer, the porous layer serves as a reinforcing material for the protective layer when bending stress is applied to the protective-layer-covered gas separation membrane, and hence the bending resistance can also be improved.

An embodiment where the gas separation membrane satisfies condition 1 is referred to as a first embodiment. An embodiment where the gas separation membrane satisfies condition 2 is referred to as a second embodiment. An embodiment where the gas separation membrane satisfies condition 3 is referred to as a third embodiment. An embodiment where the gas separation membrane satisfies condition 4 is referred to as a fourth embodiment.

The mechanisms by which good gas permeation performance is achieved in the first to fourth embodiments will be described below one by one.

In the first embodiment, where the gas separation membrane satisfies condition 1, higher ratios of A/B in inequality 1 above indicate that more oxygen atoms are permeated into the inner portion of the specific resin layer in the thickness direction. This specific resin layer serves as a layer with high gas separation selectivity, that is, a layer having separation selectivity. For corona treatment and plasma treatment intended only for surface modification for adhesion improvement, it is difficult to allow sufficient oxygen to enter the specific resin layer from its surface to a depth of 10 nm so that the specific resin layer has gas separation selectivity. Larger values of B in inequality 2 indicate that more oxygen atoms are incorporated as a result of the surface modification of the specific resin layer. In the present invention, since the specific resin layer satisfies inequalities 1 and 2 above, a gas separation membrane having at least one of high gas permeability under high pressure or high gas separation selectivity under high pressure can be obtained. While not wishing to be bound by any theory, it is believed that separation selectivity is accomplished by the incorporation of oxygen atoms into not only the surface of the specific resin layer but also the inner portion thereof in the thickness direction.

A layer having separation selectivity means a layer that, when formed as a membrane having a thickness of 0.1 to 30 μm, has a ratio ($PCO_2/PCH_4$) of carbon dioxide permeability coefficient ($PCO_2$) to methane permeability coefficient ($PCH_4$) of 1.5 or more when pure carbon dioxide ($CO_2$) and methane ($CH_4$) gases are fed to the resulting membrane at a temperature of 40° C. with the total pressure on the gas feed side set to 0.5 MPa.

Conventionally, a layer having a polyimide compound has often been used as a layer having separation selectivity for a gas separation membrane. The configuration of the gas separation membrane used in the present invention, which has a specific resin layer subjected to surface oxidation treatment and thus has at least one of high gas permeability under high pressure or high gas separation selectivity under high pressure without having a layer containing a polyimide compound, is not conventionally known.

There is generally a trade-off between the gas permeability and the gas separation selectivity of a gas separation membrane. Specifically, the gas separation selectivity of a gas separation membrane tends to decrease as its gas permeability increases, whereas the gas separation selectivity tends to increase as the gas permeability decreases. Therefore, it has been difficult for conventional gas separation membranes to have both high gas permeability and high gas separation selectivity. By contrast, the gas separation membrane used in the present invention has both high gas permeability and high gas separation selectivity.

Figure 6A:
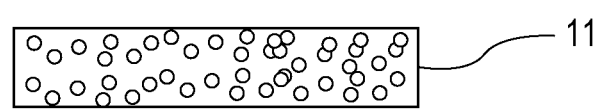
FIG. 6A is a schematic view of a polydimethylsiloxane membrane that is not subjected to a surface oxidation treatment process.
Figure 6B:
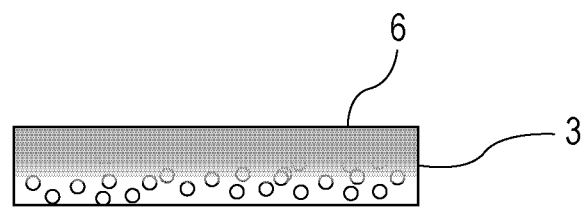
FIG. 6B is a schematic view of the resin layer containing a compound having a siloxane bond in the exemplary gas separation membrane used in the present invention.

This is because the gas separation membrane used in the present invention has, as shown in FIG. 6B, a resin layer 3 containing a compound having a siloxane bond and having a structure in which oxygen atoms are introduced with a gradation from the surface thereof. A portion in which oxygen atoms are introduced has pores formed due to siloxane bonds. In addition, the introduction of oxygen reduces the thermal motion of the polymer. Thus, the gas separation membrane has formed therein pores that allow selective permeation of a large amount of gas. Therefore, high gas separation selectivity can be provided, unlike the resin layer containing a compound having a siloxane bond before surface treatment (a polydimethylsiloxane membrane 11 that is not subjected to a surface oxidation treatment process, as shown in FIG. 6A).

Figure 6C:
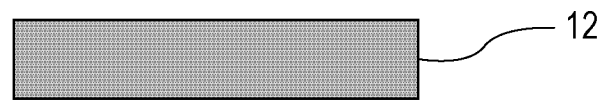
FIG. 6C is a schematic view of a polydimethylsiloxane membrane in which oxygen atoms are uniformly introduced in the thickness direction.

A polydimethylsiloxane membrane which has no gradation of oxygen atom introduction in the thickness direction and in which oxygen atoms are uniformly introduced in the thickness direction, as shown in FIG. 6C, can be prepared by chemical vapor deposition (CVD) or other methods. Such a membrane and the resin layer 3 containing a compound having a siloxane bond of the gas separation membrane used in the present invention will be compared. A portion in which oxygen atoms are densely introduced in the resin layer 3 containing a compound having a siloxane bond of the gas separation membrane used in the present invention is thinner than a polydimethylsiloxane membrane 12 in which oxygen atoms are uniformly introduced in the thickness direction. It is difficult to prepare a polydimethylsiloxane membrane in which oxygen atoms are uniformly introduced in the thickness direction so that the polydimethylsiloxane membrane is as thin as the portion in which oxygen atoms are densely introduced in the resin layer 3 containing a compound having a siloxane bond of the gas separation membrane used in the present invention. Therefore, very high gas permeability and gas separation selectivity can be achieved by the present invention.

The gas separation membrane used in the present invention can also be designed so as to have significantly high gas permeability and low gas separation selectivity. The gas separation membrane used in the present invention can also be designed so as to have low gas permeability and significantly high gas separation selectivity. In such cases, the gas separation membrane used in the present invention has higher gas separation selectivity than conventional gas separation membranes if the gas permeability performance of the gas separation membrane used in the present invention is set to be equal to that of conventional gas separation membranes. Furthermore, the gas separation membrane used in the present invention has higher gas permeability than conventional gas separation membranes if the gas separation selectivity performance of the gas separation membrane used in the present invention is set to be equal to that of conventional gas separation membranes.

The gas separation membrane used in the present invention is preferably produced by a method used in the present invention for producing a gas separation membrane. Although the performance of a gas separation membrane is believed, according to the mechanism, to depend on the size of pores in the plane of the layer that contributes to gas separation, the procedure of determining the size of pores is time-consuming and costly even if an electron microscope is used and thus is impractical at the time of filing. Instead, in this specification, it has been found that there is a high correlation between the values of A/B and B and the performance of the gas separation membrane and that, within the above ranges, a gas separation membrane that has good performance can be provided. It is expected that any method that gives activating radiation energy comparable to the energy given by plasma treatment can produce a gas separation membrane similar to those produced by plasma treatment.

In the second embodiment, where the gas separation membrane satisfies condition 2, the gas separation membrane preferably has at least one of high gas permeability under high pressure or high gas separation selectivity under high pressure and has good bending resistance.

In the second embodiment, where the gas separation membrane satisfies condition 2, the difference between the content of the repeating unit represented by general formula (3) in a surface layer of GLe extending to a depth of 20 nm and the content of the repeating unit represented by general formula (3) in a surface layer of GLi extending to a depth of 20 nm is 30% to 90%. This indicates that oxygen atoms are permeated into the inner portion of the specific resin layer (this specific resin layer serves as a layer with high gas separation selectivity, that is, a layer having separation selectivity) in the thickness direction. For corona treatment and plasma treatment intended only for surface modification for adhesion improvement, it is difficult to allow sufficient oxygen to enter the specific resin layer from its surface to a depth of 20 nm so that the specific resin layer has gas separation selectivity. Larger values of the difference between the content of the repeating unit represented by general formula (3) in a surface layer of GLe extending to a depth of 20 nm and the content of the repeating unit represented by general formula (3) in a surface layer of GLi extending to a depth of 20 nm indicate that more oxygen atoms are incorporated as a result of the surface modification of the specific resin layer. In the present invention, a gas separation membrane having at least one of high gas permeability under high pressure or high gas separation selectivity under high pressure can be obtained. While not wishing to be bound by any theory, it is believed that separation selectivity is accomplished by the incorporation of oxygen atoms into not only the surface of the specific resin layer but also the inner portion thereof in the thickness direction.

In the second embodiment, where the gas separation membrane satisfies condition 2, the gas separation membrane has a porous support A and the resin layer disposed on the porous support A and includes a region GLi where the compound having a siloxane bond is present in the porous support A and a region GLe where the resin layer is present on the porous support A, GLe has a thickness of 50 to 1,000 nm, GLi has a thickness of 20 nm or more, and the thickness of GLi is 10% to 350% of the thickness of GLe. This configuration allows a portion of the porous support and the specific resin layer to be integrated, thus providing good bending resistance.

In the third embodiment, where the gas separation membrane satisfies condition 3, the gas separation membrane preferably has at least one of high gas permeability under high pressure or high gas separation selectivity under high pressure and has high pressure resistance.

In the third embodiment, where the gas separation membrane satisfies condition 3, if the minimum percentage $Si_0$ of $Si^{2+}$ and $Si^{3+}$ peaks relative to all Si peaks in ESCA depth profiling of the specific resin layer is not more than the upper limit, the gas separation membrane has good gas permeation performance and good pressure resistance. If the minimum percentage $Si_0$ of $Si^{2+}$ and $Si^{3+}$ peaks relative to all Si peaks in ESCA depth profiling of the specific resin layer is not less than the lower limit, the gas separation membrane has good gas permeation performance without a noticeable change in pressure resistance.

In the gas separation membrane according to the third embodiment, the minimum percentage $Si_0$ of $Si^{2+}$ and $Si^{3+}$ peaks relative to all Si peaks in ESCA depth profiling of the specific resin layer is 1% to 40%. FIG. 6B is a schematic view of a resin layer containing a compound having a siloxane bond in an exemplary gas separation membrane used in the present invention. For example, if the gas separation membrane has a resin layer 3 containing a compound having a siloxane bond and having, as shown in FIG. 6B, a structure in which oxygen atoms are introduced with a gradation from the surface thereof, the minimum percentage $Si_0$ of $Si^{2+}$ and $Si^{3+}$ peaks relative to all Si peaks in ESCA depth profiling of the resin layer can be easily set to 1% to 40%. A portion in which oxygen atoms are introduced has pores formed due to siloxane bonds. The introduction of oxygen also reduces the thermal motion of the polymer. Thus, the gas separation membrane according to the third embodiment, in which the minimum percentage $Si_0$ of $Si^{2+}$ and $Si^{3+}$ peaks relative to all Si peaks in ESCA depth profiling of the specific resin layer is 1% to 40%, has formed therein pores that allow selective permeation of a large amount of gas. By contrast, in the case of the polydimethylsiloxane membrane 11 that is not subjected to a surface oxidation treatment process, as shown in FIG. 6A, the minimum percentage $Si_0$ of $Si^{2+}$ and $Si^{3+}$ peaks relative to all Si peaks in ESCA depth profiling of the specific resin layer exceeds 40%. Therefore, unlike the resin layer containing a compound having a siloxane bond before surface oxidation treatment (the polydimethylsiloxane membrane 11 that is not subjected to a surface oxidation treatment process, as shown in FIG. 6A), the configuration of the gas separation membrane according to the third embodiment can provide high gas separation selectivity.

Furthermore, the gas separation membrane according to the third embodiment also has high pressure resistance since the minimum percentage $Si_0$ of $Si^{2+}$ and $Si^{3+}$ peaks relative to all Si peaks in ESCA depth profiling of the specific resin layer is 40% or less. The mechanism by which high pressure resistance is provided if the minimum percentage $Si_0$ of $Si^{2+}$ and $Si^{3+}$ peaks relative to all Si peaks in ESCA depth profiling of the specific resin layer is 40% or less is not known. While not wishing to be bound by any theory, the inventors presume that the mechanism is as follows.

As compared to a glass membrane made solely of $Si^{4+}$, the membrane density decreases with increasing percentage of $Si^{2+}$ and $Si^{3+}$. This probably explains why the gas separation membrane according to the third embodiment, in which the minimum percentage $Si_0$ of $Si^{2+}$ and $Si^{3+}$ peaks relative to all Si peaks is 40% or less, provides a membrane density that leads to sufficient pressure resistance.

A silica membrane which has no gradation of oxygen atom introduction in the thickness direction and in which oxygen atoms are uniformly introduced in the thickness direction, as shown in FIG. 6C, can be prepared by chemical vapor deposition (CVD) or other methods. Such a membrane and the resin layer 3 containing a compound having a siloxane bond of the gas separation membrane according to the third embodiment will be compared. For a silica membrane in which oxygen atoms are uniformly introduced in the thickness direction, as shown in FIG. 6C, the minimum percentage $Si_O$ of $Si^{2+}$ and $Si^{3+}$ peaks relative to all Si peaks in ESCA depth profiling of the resin layer containing a compound having a siloxane bond is highly likely to be lower than 1% and is difficult to control.

A portion in which oxygen atoms are densely introduced in the resin layer 3 containing a compound having a siloxane bond of the gas separation membrane according to the third embodiment, is preferably thinner than a silica membrane in which oxygen atoms are uniformly introduced in the thickness direction. It is difficult to prepare a silica membrane in which oxygen atoms are uniformly introduced in the thickness direction so that the silica membrane is as thin as the portion in which oxygen atoms are densely introduced in the resin layer 3 containing a compound having a siloxane bond of the gas separation membrane according to the third embodiment.

Therefore, the gas separation membrane according to the third embodiment can achieve much higher gas permeability than a silica membrane in which oxygen atoms are uniformly introduced in the thickness direction while having pressure resistance.

In the fourth embodiment, where the gas separation membrane satisfies condition 4, the gas separation membrane preferably has at least one of high gas permeability under high pressure or high gas separation selectivity under high pressure.

The gas separation membrane according to the fourth embodiment is configured such that the positron lifetime τ3 of a third component formed by implantation of a positron with an energy of 1 keV into the surface of the specific resin layer is 3.40 to 4.20 ns. This configuration can provide a gas separation membrane having at least one of high gas permeability under high pressure or high gas separation selectivity under high pressure. The positron lifetime of the third component is measured by a method described in the Examples below.

The gas separation membrane according to the fourth embodiment has a gradation structure, as shown in FIG. 6B, in which silica (a compound having tetravalent silicon atoms $Si^{4+}$, as represented by general formula (1) below) and silicone (having di- or trivalent silicon atoms $Si^{2+}$ or $Si^{3+}$, as represented by general formula (2) or (3) below) are mixed together. This configuration increases the adhesion at silica/silicone interfaces, with the result that the membrane will not be broken under high $CO_2$ partial pressure and will remain highly selective. The gradation structure of the specific resin layer in which silica and silicone are mixed together is related to the value of X/Y described below being in a preferred range.

A preferred embodiment of a protective-layer-covered gas separation membrane according to the present invention will now be described.

Configuration

The gas separation membrane used in the present invention is preferably a thin film composite (also referred to as a gas separation composite membrane), an asymmetric membrane, or a hollow fiber membrane, more preferably a thin film composite.

The protective-layer-covered gas separation membrane may be roll-shaped. Since a specific resin layer obtained by surface oxidation treatment is brittle, the gas permeation performance is decreased after a gas separation membrane with no protective layer is wound into a roll. By contrast, the protective-layer-covered gas separation membrane according to the present invention has a protective layer and a porous layer and hence, when wound into a roll, has good initial gas permeation performance, good abrasion resistance, and good bending resistance.

Hereinafter, the case where the gas separation membrane is a thin film composite may be described as a representative example, but the gas separation membrane used in the present invention is not limited to a thin film composite.

A preferred configuration of the protective-layer-covered gas separation membrane according to the present invention will be described with reference to the drawings.

Figure 8:
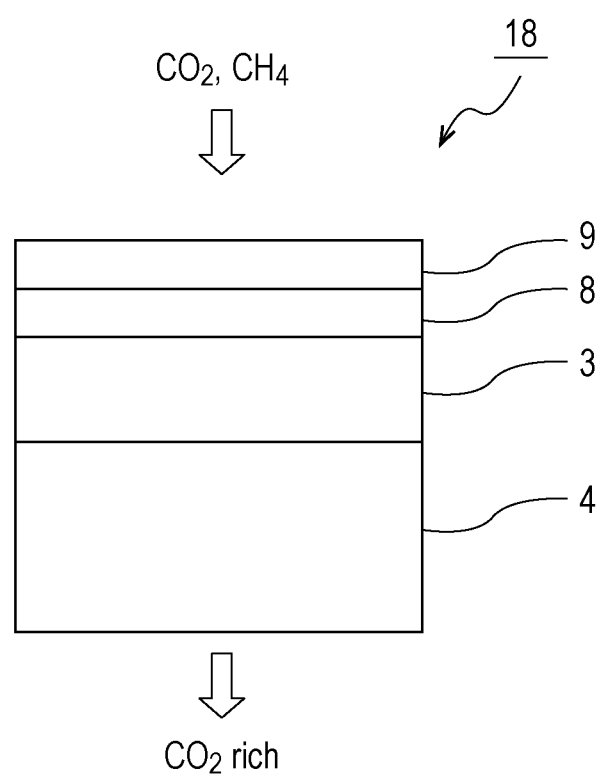
FIG. 8 is a schematic view of an exemplary protective-layer-covered gas separation membrane according to the present invention.

An exemplary protective-layer-covered gas separation membrane 18 according to the present invention shown in FIG. 8 is a gas separation membrane having a support 4, a resin layer 3 containing a compound having a siloxane bond, a protective layer 8, and a porous layer 9 disposed in this order. In the protective-layer-covered gas separation membrane 18 according to the present invention, as shown in FIG. 8, the porous layer 9 is preferably adjacent to the protective layer 8 to provide gas permeation performance better than that provided when another layer is disposed between the porous layer 9 and the protective layer 8. In the protective-layer-covered gas separation membrane according to the present invention, the resin layer 3 containing a compound having a siloxane bond of the gas separation membrane and the protective layer 8 are preferably adjacent to each other to provide good initial gas permeation performance, good abrasion resistance, and good bending resistance.

The members other than the protective layer 8 and the porous layer 9 of the protective-layer-covered gas separation membrane according to the present invention may be referred to as a gas separation membrane. An exemplary gas separation membrane 10 used in the present invention shown in FIG. 1 is a thin film composite and is a gas separation membrane having the support 4 and the resin layer 3 containing a compound having a siloxane bond.

Another exemplary gas separation membrane 10 used in the present invention shown in FIG. 2 further has, in addition to the support 4 and the resin layer 3 containing a compound having a siloxane bond, an additional resin layer 1, which will be described later, on the side of the resin layer 3 containing a compound having a siloxane bond facing away from the support 4.

Figure 3:
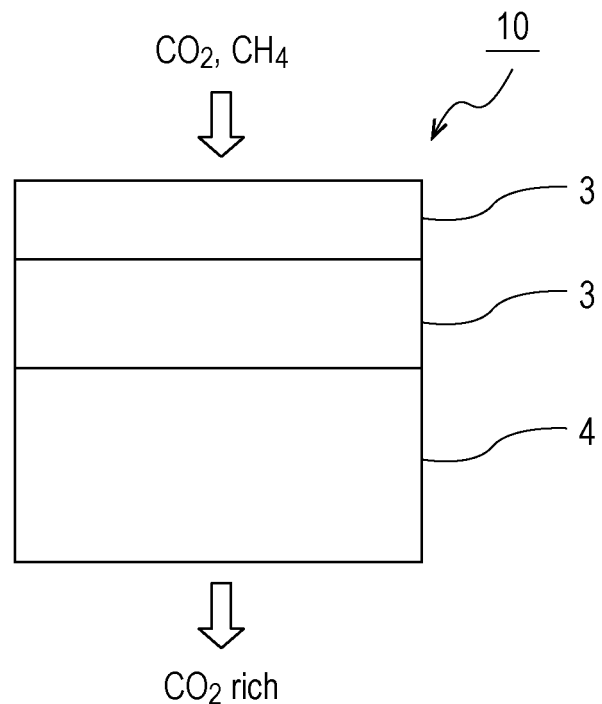
FIG. 3 is a schematic view of another exemplary gas separation membrane used in the present invention.

The gas separation membrane used in the present invention may have a single specific resin layer or two or more specific resin layers. The gas separation membrane used in the present invention preferably has 1 to 5 specific resin layers, more preferably 1 to 3 specific resin layers, and, in terms of production cost, particularly preferably 1 or 2 specific resin layers, more particularly preferably a single specific resin layer. Another exemplary gas separation membrane 10 used in the present invention shown in FIG. 3 has two resin layers 3 each containing a compound having a siloxane bond.

In this specification, "on a support" means that any other layer may be interposed between the support and a layer having separation selectivity. Expressions using "upper" and "lower" are defined as follows: as shown in FIG. 1, the side to which the gas to be separated is fed is referred to as "upper", whereas the side to which the separated gas is discharged is referred to as "lower", unless otherwise specified.

In the gas separation membrane according to the first embodiment, the specific resin layer satisfies inequalities 1 and 2:

inequality 1: $0.9 \geq A/B \geq 0.55$ inequality 2: $B \geq 1.7$ wherein A represents an O/Si ratio that is a ratio of the number of oxygen atoms to the number of silicon atoms contained in the resin layer at a depth of 10 nm from a surface of the resin layer, and B represents an O/Si ratio that is a ratio of the number of oxygen atoms to the number of silicon atoms in the surface of the resin layer. The surface of the resin layer refers to a surface of the resin layer on the side to which the gas to be separated is fed.

Figure 4:
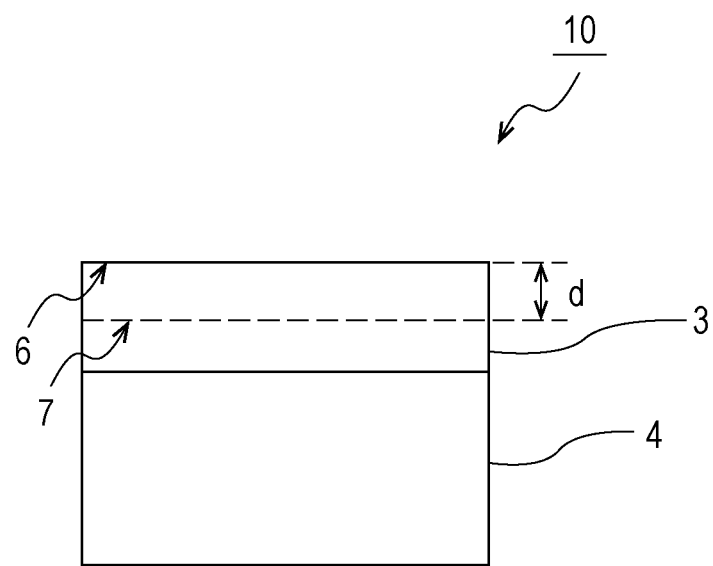
FIG. 4 is a schematic view illustrating the positions of a plane of a resin layer containing a compound having a siloxane bond at a depth d from a surface of the resin layer containing a compound having a siloxane bond (toward a support) and the position of the surface of the resin layer containing a compound having a siloxane bond in the exemplary gas separation membrane used in the present invention.

Inequalities 1 and 2, which the specific resin layer satisfies, will be described with reference to FIG. 4. In FIG. 4, the surface of the resin layer 3 containing a compound having a siloxane bond is denoted by reference numeral 6. In inequalities 1 and 2 above, B means an O/Si ratio that is a ratio of the number of oxygen atoms to the number of silicon atoms in the surface 6 of the specific resin layer.

In FIG. 4, if d is 10 nm, a plane parallel to the "surface of the resin layer containing a compound having a siloxane bond", i.e., the surface 6, at a depth of 10 nm from the surface of the resin layer 3 containing a compound having a siloxane bond (toward the support) is a "plane of the resin layer containing a compound having a siloxane bond at a depth of 10 nm from the surface of the resin layer containing a compound having a siloxane bond (toward the support)" denoted by reference numeral 7. In inequality 1 above, A means an O/Si ratio that is a ratio of the number of oxygen atoms to the number of silicon atoms in the "plane of the resin layer containing a compound having a siloxane bond at a depth of 10 nm from the surface of the resin layer containing a compound having a siloxane bond (toward the support)", i.e., the plane 7.

Figure 7:
FIG. 7 is a schematic view of another exemplary gas separation membrane used in the present invention.

A preferred configuration of the gas separation membrane according to the second embodiment will be described with reference to the drawings. An exemplary gas separation membrane 10 according to the second embodiment shown in FIG. 1 is a thin film composite and is a gas separation membrane having a porous support A (reference numeral 4) and the resin layer 3 containing a compound having a siloxane bond. As shown in FIG. 7, the gas separation membrane according to the second embodiment has the porous support A and the resin layer disposed on the porous support A, and the gas separation membrane includes a region GLi where the compound having a siloxane bond is present in the porous support A and a region GLe where the resin layer is present on the porous support A.

Preferred configurations of the gas separation membrane according to the third and fourth embodiments will be described with reference to the drawings. In FIG. 4, the surface of the resin layer 3 containing a compound having a siloxane bond is denoted by reference numeral 6.

In FIG. 4, if d is 10 nm, a plane parallel to the "surface of the resin layer containing a compound having a siloxane bond", i.e., the surface 6, at a depth of 10 nm from the surface of the resin layer 3 containing a compound having a siloxane bond (toward the support) is a "plane of the resin layer containing a compound having a siloxane bond at a depth of 10 nm from the surface of the resin layer containing a compound having a siloxane bond (toward the support)" denoted by reference numeral 7.

Support

The protective-layer-covered gas separation membrane according to the present invention preferably includes a support. More preferably, the support has the specific resin layer formed thereon. The support is preferably a thin, porous material to provide sufficient gas permeability.

The protective-layer-covered gas separation membrane according to the present invention may have the resin layer 3 containing a compound having a siloxane bond formed and disposed on the surface of or inside the porous support. The formation of the resin layer 3 on the surface can readily provide a thin film composite. The formation of the resin layer 3 containing a compound having a siloxane bond on the surface of the porous support can provide a gas separation membrane having the advantage of combining high gas separation selectivity, high gas permeability, and mechanical strength.

In particular, the gas separation membrane according to the second embodiment has a porous support A and the resin layer disposed on the porous support A, and the gas separation membrane includes a region GLi where the compound having a siloxane bond is present in the porous support A and a region GLe where the resin layer is present on the porous support A. In other words, the gas separation membrane according to the second embodiment is a thin film composite in which the resin layer 3 containing a compound having a siloxane bond is formed and disposed in (in the inner portion of) and on (on the surface of) the porous support. By forming the resin layer 3 containing a compound having a siloxane bond on the surface of the porous support, the porous support is partially impregnated and filled with the compound having a siloxane bond. This results in the formation of a porous support A not filled with the resin layer containing a compound having a siloxane bond, GLi, which is a region where a portion of the resin layer containing a compound having a siloxane bond is present in the porous support A, and GLe described above, which is a region where the rest of the resin layer containing a compound having a siloxane bond is present on the porous support A. This configuration can provide a gas separation membrane having the advantage of combining high gas separation selectivity, high gas permeability, and bending resistance.

If the protective-layer-covered gas separation membrane according to the present invention is a thin film composite, the thin film composite is preferably formed by applying ("applying" as used herein encompasses depositing on a surface by immersion) a coating liquid (dope) for the resin layer 3 containing a compound having a siloxane bond to a surface of a porous support. Specifically, the support preferably has a porous layer on the resin layer 3 side, the resin layer 3 containing a compound having a siloxane bond. More preferably, the support is a layered body of a nonwoven fabric and the porous layer disposed on the resin layer 3 side, the resin layer 3 containing a compound having a siloxane bond.

The porous layer preferably used for the support may be any porous layer that serves the purpose of imparting mechanical strength and high gas permeability and may be made of an organic material or an inorganic material. The porous layer is preferably a porous organic polymer membrane and has a thickness of 1 to 3,000 µm, preferably 5 to 500 µm, more preferably 5 to 150 µm. The pore structure of the porous layer typically has an average pore size of 10 µm or less, preferably 0.5 µm or less, more preferably 0.2 µm or less, and preferably has a porosity of 20% to 90%, more preferably 30% to 80%. The porous layer preferably has a molecular weight cut-off of 100,000 or less and preferably has a gas permeability, as expressed in terms of carbon dioxide permeation rate, of $3 \times 10^{-5}$ $cm^3$ (STP)/ $cm^2 \cdot cm \cdot sec \cdot cmHg$ (30 GPU; GPU is an abbreviation for gas permeation unit) or more. Examples of materials for the porous layer include known polymers, for example, various resins, including polyolefin resins such as polyethylene and polypropylene; fluorocarbon resins such as polytetrafluoroethylene, polyvinyl fluoride, and polyvinylidene fluoride;

and other resins such as polystyrene, cellulose acetate, polyurethane, polyacrylonitrile, polyphenylene oxide, polysulfone, polyethersulfone, polyimide, and polyaramid. The porous layer may be of any shape, such as a tabular, spiral, tubular, or hollow-fiber shape.

The thin film composite preferably has a woven fabric, a non-woven fabric, a net, or the like under the porous layer disposed on the resin layer 3 side, the resin layer 3 containing a compound having a siloxane bond, to provide mechanical strength. In terms of ease of membrane formation and cost, a non-woven fabric is suitable for use. The non-woven fabric may be formed of a fiber such as polyester, polypropylene, polyacrylonitrile, polyethylene, or polyamide fiber or any combination thereof. The non-woven fabric can be produced, for example, by forming a sheet from a homogeneous dispersion of a base fiber and a binder fiber in water with a cylinder machine, a Fourdrinier machine, or other machine and drying the resulting sheet with a dryer. Furthermore, for the purpose of, for example, removing fuzz or improving mechanical properties, it is preferable to hot-press the non-woven fabric by nipping it between two rollers.

Resin Layer Containing Compound Having Siloxane Bond (Specific Resin Layer)

The protective-layer-covered gas separation membrane according to the present invention has a resin layer containing a compound having a siloxane bond.

Resin Layer Containing Compound Having Siloxane Bond in First Embodiment

In the gas separation membrane according to the first embodiment, the resin layer satisfies inequalities 1 and 2:

inequality 1: $0.9 \geq A/B \geq 0.55$ inequality 2: $B \geq 1.7$ wherein A represents an O/Si ratio that is a ratio of the number of oxygen atoms to the number of silicon atoms contained in the resin layer at a depth of 10 nm from the surface of the resin layer, and B represents an O/Si ratio that is a ratio of the number of oxygen atoms to the number of silicon atoms in the surface of the resin layer.

In the resin layer, A/B is preferably 0.60 or more, more preferably 0.64 or more.

In the resin layer, B is preferably 1.95 or more.

In this specification, the ratio of the number of oxygen atoms to the number of silicon atoms in each plane of the specific resin layer can be measured as a relative quantity. In other words, an O/Si ratio (A) that is a ratio of the number of oxygen atoms to the number of silicon atoms in the specific resin layer at a depth of 10 nm from a surface of the specific resin layer and an O/Si ratio (B) that is a ratio of the number of oxygen atoms to the number of silicon atoms in the surface of the specific resin layer can be measured as a relative quantity. As with the O/Si ratio (A) and the O/Si ratio (B), an O/Si ratio (C) that is a ratio of the number of oxygen atoms to the number of silicon atoms contained in the specific resin layer at depths of 30 nm and 50 nm from the surface of the specific resin layer (preferably at depths of 30 nm toward the support and 50 nm toward the support) can also be measured as a relative quantity. As with the O/Si ratio (A) and the O/Si ratio (B), a carbon/silicon ratio that is a ratio of the number of carbon atoms to the number of silicon atoms in the surface of the specific resin layer can also be measured as a relative quantity.

The O/Si ratio (A) that is the ratio of the number of oxygen atoms to the number of silicon atoms contained in the specific resin layer at a depth of 10 nm from the surface of the specific resin layer and the O/Si ratio (B) that is the ratio of the number of oxygen atoms to the number of silicon atoms in the surface of the specific resin layer are calculated using electron spectroscopy for chemical analysis (ESCA). The carbon/silicon ratio that is the ratio of the number of carbon atoms to the number of silicon atoms in the surface of the specific resin layer is calculated in the same manner.

The porous support having the specific resin layer formed thereon is placed in a Quantera SXM available from Physical Electronics, Inc. The O/Si ratio (B) that is the ratio of the number of oxygen atoms to the number of silicon atoms in the surface of the specific resin layer is calculated under the following conditions: X-ray source, Al-Kα radiation (1,490 eV, 25 W, 100 μm in diameter); measurement region, 300 μm×300 μm; pass energy, 55 eV; step, 0.05 eV.

Subsequently, to determine the O/Si ratio (A) that is the ratio of the number of oxygen atoms to the number of silicon atoms contained in the specific resin layer at a depth of 10 nm from the surface of the resin layer, etching is performed with $C_{60}$ ions.

Specifically, a 2 mm×2 mm region is etched to a depth of 10 nm with a $C_{60}^+$ ion beam with an energy of 10 keV at 10 nA from a $C_{60}$ ion gun associated with a Quantera SXM produced by Physical Electronics, Inc. Using the ESCA apparatus on this film, the O/Si ratio (A) that is the ratio of the number of oxygen atoms to the number of silicon atoms in the surface of the specific resin layer at a depth of 10 nm from the surface of the resin layer is calculated. The depth from the surface of the specific resin layer is calculated from the etching rate of the material forming the specific resin layer, namely, 10 nm/min. This value depends on the material; thus, the most suitable value is used as appropriate.

From the calculated O/Si ratio (A) that is the ratio of the number of oxygen atoms to the number of silicon atoms in the specific resin layer at a depth of 10 nm from the surface of the specific resin layer and the calculated O/Si ratio (B) that is the ratio of the number of oxygen atoms to the number of silicon atoms in the surface of the specific resin layer, the value of A/B is calculated.

The O/Si ratio (C) that is the ratio of the number of oxygen atoms to the number of silicon atoms in the specific resin layer at a depth of 30 nm from the surface of the specific resin layer is determined in the same manner as the O/Si ratio (A) that is the ratio of the number of oxygen atoms to the number of silicon atoms in the specific resin layer at a depth of 10 nm from the surface of the specific resin layer. From the O/Si ratio (B) and the O/Si ratio (C), the value of C/B is calculated.

In this specification, the surface of the resin layer is a plane in which the O/Si ratio is maximized as measured from a surface of the gas separation membrane (preferably the surface facing away from the support) and in which silicon atoms are contained in an amount of 3% (atomic %).

The case where the number of oxygen atoms per unit area in each plane of the resin layer is measured as a relative quantity will be described. In the resin layer, the O/Si ratio (A) that is the ratio of the number of oxygen atoms to the number of silicon atoms contained in the specific resin layer at a depth of 10 nm from the surface of the specific resin layer is preferably more than 1.0 and not more than 3.0, more preferably 1.1 to 2.4, particularly preferably 1.3 to 2.35.

The O/Si ratio (C) that is the ratio of the number of oxygen atoms to the number of silicon atoms contained in the specific resin layer at a depth of 30 nm from the surface of the specific resin layer is preferably 1.0 to 2.4, particularly preferably 1.05 to 2.3.

The value of C/B is preferably 0.50 to 0.95, more preferably 0.50 to 0.90, particularly preferably 0.50 to 0.85.

In the gas separation membrane according to the first embodiment, the ratio (carbon/silicon ratio) of the number of carbon atoms to the number of silicon atoms in the surface of the specific resin layer is preferably 1.6 or less, more preferably 0.1 to 1.3, particularly preferably 0.1 to 1.1.

To increase storage resistance, the gas separation membrane according to the first embodiment preferably has a gel fraction of 45% or more. By controlling the gel fraction of the gas separation membrane, the moisture-heat resistance of the gas separation membrane can be improved. Consequently, the performance of the gas separation membrane becomes stable to environments during storage and thus does not deviate from the range of gas separation performance specified at the time of shipment. The yield after shipment is also improved.

To increase moisture-heat (transport) resistance in addition to storage resistance, the gas separation membrane according to the first embodiment more preferably has a gel fraction of more than 55%, particularly preferably 70% or more. The performance of the gas separation membrane becomes stable to moist and hot environments during transportation and thus does not deviate from the range of gas separation performance specified at the time of shipment. The yield after shipment is also improved.

In this specification, a value measured by the following method is used as the gel fraction of the gas separation membrane. A sample is prepared by applying and curing a specific resin layer with a thickness of 10 μm or less to a porous support. The sample is subjected to X-ray fluorescence (XRF) analysis to measure the signal strength Xa of Si components. Another sample is prepared by applying and curing a specific resin layer and then immersing it in chloroform solvent for 24 hours to extract soluble components. The sample obtained by extracting soluble components is then subjected to XRF analysis to measure the signal strength Xb of Si components. The gel fraction is defined as Xb/Xa×100%. The solvent used for extraction may be a solvent other than chloroform, for example, hexane.

In the gas separation membrane, the resin layer containing a compound having a siloxane bond preferably has a value represented by the following expression of 5,000 nm or less, more preferably 900 nm or less, particularly 100 to 900 nm:

expression: thickness of resin layer containing compound having siloxane bond×(1−gel fraction/100).

Resin Layer Containing Compound Having Siloxane Bond in Second Embodiment

The gas separation membrane according to the second embodiment has a porous support A and the resin layer disposed on the porous support A and includes a region GLi where the compound having a siloxane bond is present in the porous support A and a region GLe where the resin layer is present on the porous support A.

GLe has a thickness of 50 to 1,000 nm.

GLi has a thickness of 20 nm or more, and the thickness of GLi is 10% to 350% of the thickness of GLe.

The difference between the content of the repeating unit represented by general formula (3) in a surface layer of GLe extending to a depth of 20 nm and the content of the repeating unit represented by general formula (3) in a surface layer of GLi extending to a depth of 20 nm is 30% to 90%.

In the gas separation membrane according to the second embodiment, the thickness of GLe is 50 to 1,000 nm, preferably 200 to 900 nm, more preferably 300 to 800 nm. A thickness of GLe of not less than the lower limit leads to an improved stress relaxation effect upon bending. This results in good bending resistance in a region having a high silica content (having a high content of the repeating unit represented by general formula (3)) formed in the upper portion of the specific resin layer (a region on the side facing away from the porous support A). A thickness of GLe of not more than the upper limit provides good gas separation performance without sacrifice of gas permeability. The measurement of GLe and GLi is carried out after a surface oxidation treatment described later.

In the gas separation membrane according to the second embodiment, the thickness of GLi is 20 nm or more, and the absolute value of the thickness of GLi can be set within any range without departing from the spirit of the present invention.

In the gas separation membrane according to the second embodiment, the thickness of GLi (the percentage of the thickness of GLi (% relative to GLe)) is 10% to 350%, preferably 20% to 90%, more preferably 20% to 60%, particularly preferably 21.2% to 60%, of the thickness of GLe. A percentage of the thickness of GLi (% relative to GLe) of not less than the lower limit leads to improved adhesion to the porous support A, resulting in good bending resistance in a region having a high silica content (having a high content of the repeating unit represented by general formula (3)) formed in the upper portion of the specific resin layer (a region on the side facing away from the porous support A). A percentage of the thickness of GLi (% relative to GLe) of not more than the upper limit, i.e., a reasonably low degree of GLi infiltration, provides good gas separation performance without sacrifice of gas permeability.

In the gas separation membrane according to the second embodiment, the difference between the content of the repeating unit represented by general formula (3) in a surface layer of GLe extending to a depth of 20 nm and the content of the repeating unit represented by general formula (3) in a surface layer of GLi extending to a depth of 20 nm is 30% to 90%, preferably 40% to 90% from the viewpoint of bending resistance. If the difference between the content of the repeating unit represented by general formula (3) in a surface layer of GLe extending to a depth of 20 nm and the content of the repeating unit represented by general formula (3) in a surface layer of GLi extending to a depth of 20 nm is not less than the lower limit, the desired gas permeation selectivity is provided. If the difference between the content of the repeating unit represented by general formula (3) in a surface layer of GLe extending to a depth of 20 nm and the content of the repeating unit represented by general formula (3) in a surface layer of GLi extending to a depth of 20 nm is not more than the upper limit, the difference in stress upon bending between the surface of GLe and the surface of GLi can be sufficiently reduced by the specific resin layer interposed therebetween, resulting in good bending resistance.

In the gas separation membrane according to the second embodiment, the content of the repeating unit represented by general formula (3) in a surface layer of GLe extending to a depth of 20 nm is preferably 30% to 95%, more preferably 40% to 95%, particularly preferably 45% to 90%.

In the gas separation membrane according to the second embodiment, the content of the repeating unit represented by general formula (3) in a surface layer of GLi extending to a depth of 20 nm is preferably 1% to 10%, more preferably 3% to 8%, particularly preferably 4% to 6%.

In the gas separation membrane according to the second embodiment, the specific resin layer may have any thickness. For ease of membrane formation, the specific resin layer preferably has a thickness of 0.1 μm or more, more preferably 0.1 to 5 µm, particularly preferably 0.1 to 4 µm, more particularly preferably 0.3 to 3 µm.

It is difficult to evaluate, with a scanning electron microscope (SEM), the thickness of each layer of the gas separation membrane having the porous support A, the specific resin layer thereon, and optionally other layers. Thus, GLe and GLi in the present invention are identified by time-of-flight secondary mass spectrometry (TOF-SIMS) depth profiling. In a depth profile, GLe is defined as a range, extending from the position of a peak attributed to silicone, where the peak intensity is 90% or more of the maximum peak intensity, GLi is defined as a range where the peak intensity is from 20% to less than 90% of the maximum peak intensity, and the porous support A is defined as a range where the peak intensity is less than 20% of the maximum peak intensity.

The thickness of the specific resin layer can be controlled by adjusting the amount of curable composition applied.

Resin Layer Containing Compound Having Siloxane Bond in Third Embodiment

In the gas separation membrane according to the third embodiment, the minimum percentage $Si_0$ of $Si^{2+}$ and $Si^{3+}$ peaks relative to all Si peaks in ESCA depth profiling of the specific resin layer is 1% to 40%. "All Si peaks" refers to the sum of $Si^{2+}$, $Si^{3+}$, and $Si^{4+}$ peaks (also referred to as all Si) in ESCA depth profiling of the specific resin layer.

In the gas separation membrane according to the third embodiment, the minimum percentage $Si_0$ of $Si^{2+}$ and $Si^{3+}$ peaks relative to all Si peaks in ESCA depth profiling of the specific resin layer is preferably 3% to 35%, more preferably 4% to 30%.

If the minimum percentage $Si_0$ of $Si^{2+}$ and $Si^{3+}$ peaks relative to all Si peaks in ESCA depth profiling of the specific resin layer is not more than the upper limit, the gas separation membrane has good gas permeation performance and good pressure resistance. If the minimum percentage $Si_0$ of $Si^{2+}$ and $Si^{3+}$ peaks relative to all Si peaks in ESCA depth profiling of the specific resin layer is not less than the lower limit, the gas separation membrane has good gas permeation performance without a noticeable change in pressure resistance.

For example, if surface modification is performed by plasma treatment as the method for controlling the percentage of $Si^{2+}$ and $Si^{3+}$ peaks relative to all Si peaks, it can be controlled by adjusting the plasma input power (W), the plasma treatment time (irradiation time), and the flow rate of $O_2$ gas introduced.

In the gas separation membrane according to the third embodiment, Δ1 is preferably 50% to 90%, more preferably 55% to 85%, particularly preferably 60% to 80%. Δ1 represents the difference between the minimum percentage $Si_0$ of $Si^{2+}$ and $Si^{3+}$ peaks relative to all Si peaks and the percentage $Si_{10}$ of $Si^{2+}$ and $Si^{3+}$ relative to all Si peaks at a depth of 10 nm from the position where the minimum percentage $Si_0$ of $Si^{2+}$ and $Si^{3+}$ peaks relative to all Si peaks is reached in ESCA depth profiling of the specific resin layer.

The gas separation membrane according to the third embodiment, Δ2 is preferably 55% to 90%, more preferably 60% to 85%, particularly preferably 65% to 80%. Δ2 represents the difference between the minimum percentage $Si_0$ of $Si^{2+}$ and $Si^{3+}$ peaks relative to all Si peaks and the percentage $Si_{20}$ of $Si^{2+}$ and $Si^{3+}$ relative to all Si peaks at a depth of 20 nm from the position where the minimum percentage $Si_0$ of $Si^{2+}$ and $Si^{3+}$ peaks relative to all Si peaks is reached in ESCA depth profiling of the specific resin layer.

If Δ1 or Δ2 is within the above preferred range, the gas separation membrane can retain its pressure resistance while having good gas permeation performance. If Δ1 or Δ2 is not less than the lower limit of the above preferred range, the gas separation membrane has good gas permeation performance without a noticeable change in pressure resistance. If Δ1 or Δ2 is not more than the upper limit of the above preferred range, the gas separation membrane has good pressure resistance.

Larger values of Δ1 or Δ2 indicate that more oxygen atoms are permeated into the inner portion of the specific resin layer in the thickness direction. Presumably, the specific resin layer serves as a layer with high gas separation selectivity, that is, a layer having separation selectivity. If the specific resin layer is the outermost layer of the gas separation membrane, the position where the minimum percentage ($Si_0$) of $Si^{2+}$ and $Si^{3+}$ peaks relative to all Si peaks is reached is preferably the "surface of the resin layer containing a compound having a siloxane bond", i.e., the surface 6 in FIG. 4. The "surface of the resin layer containing a compound having a siloxane bond", i.e., the surface 6, is the surface of the specific resin layer facing away from the support 4.

Figure 2:
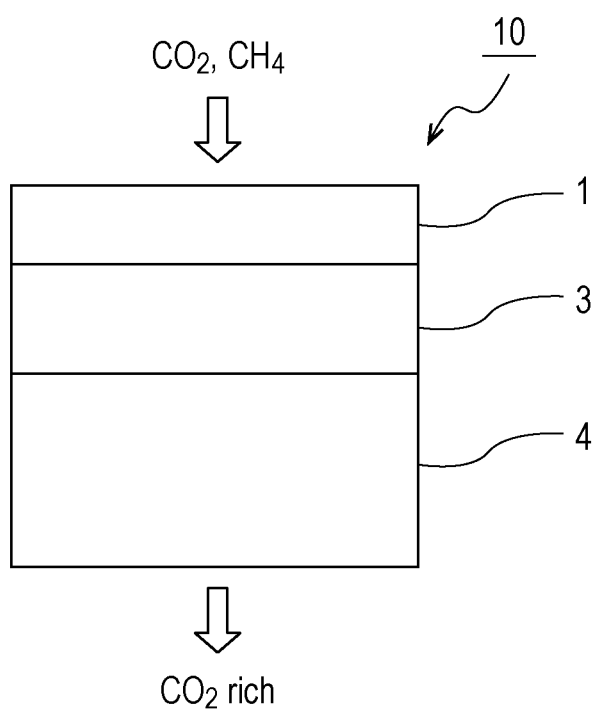
FIG. 2 is a schematic view of another exemplary gas separation membrane used in the present invention.

The case where the specific resin layer is not the outermost layer of the gas separation membrane but, for example, another layer such as the additional resin layer 1 in FIG. 2 is the outermost layer will be described. In this case, the position where the minimum percentage ($Si_0$) of $Si^{2+}$ and $Si^{3+}$ peaks relative to all Si peaks is reached is preferably the interface between the specific resin layer and the other layer (e.g., the additional resin layer 1 in FIG. 2), that is, the "surface of the resin layer containing a compound having a siloxane bond". In such cases, for corona treatment and plasma treatment intended only for surface modification for adhesion improvement, it is difficult to allow sufficient oxygen to enter the specific resin layer from its surface to a depth of 10 nm or 20 nm so that the specific resin layer has gas separation selectivity. That is to say, the surface of the specific resin layer is the position where the minimum percentage ($Si_0$) of $Si^{2+}$ and $Si^{3+}$ peaks relative to all Si peaks is reached. If Δ1 or Δ2 is within the preferred range, the specific resin layer has at least one of a higher gas permeability under high pressure or a higher gas separation selectivity under high pressure. While not wishing to be bound by any theory, it is believed that a higher separation selectivity can be accomplished by the incorporation of oxygen atoms into not only the surface of the specific resin layer but also the inner portion thereof in the thickness direction.

Resin Layer Containing Compound Having Siloxane Bond in Fourth Embodiment

In the gas separation membrane according to the fourth embodiment, the positron lifetime τ3 of a third component formed by implantation of a positron with an energy of 1 keV into the surface of the resin layer is 3.40 to 4.20 ns, preferably 3.40 to 4.11 ns, more preferably 3.40 to 4.10 ns, particularly preferably 3.40 to 3.99.

Positron annihilation spectroscopy is a technique for evaluating voids (free-volume holes) having void sizes of from about 1 Å to 10 nm, which is difficult to measure by other techniques, based on the fact that positrons are extremely small. The size of voids in a layer containing a polymer compound can be calculated after analyzing a third component, which is a long-lived component of a positron lifetime spectrum, and measuring the positron lifetime τ3 of the third component (o-Ps). Positrons combine with electrons in a polymer to form orthopositronium o-Ps. The o-Ps is believed to be trapped in voids and annihilate. The lifetime $τ_3$ of the o-Ps is expressed as a function of void radius R. The positron lifetime can be analyzed by using the non-linear least-squares program POSITRONFIT. At the same time, the relative intensity I3 of the third component, which indicates void porosity, is calculated.

If a positron beam apparatus with an electron linear accelerator is used, the positron implantation energy can be varied. At a lower energy, pore information can be obtained from a position closer to the surface, and at a higher energy, void information can be obtained from a deeper position. At an implantation energy of 1 keV, information can be mainly obtained from a position about 20 nm from the surface in the depth direction, and at an implantation energy of 3 key, information can be mainly obtained from a position about 200 nm from the surface in the depth direction.

If the positron lifetime τ3 of a third component formed by implantation of a positron with an energy of 1 keV into the surface of the specific resin layer is, for example, 3.40 to 4.20 ns, voids having an average void size of 0.78 to 0.86 nm are expected to be present at a position about 20 nm from the surface of the specific resin layer in the depth direction (toward the support). If voids having such a void size are present at a position about 20 nm from the surface of the specific resin layer in the depth direction (toward the support), the specific resin layer has a void size appropriate for separation of $CO_2$ and $CH_4$. As a result, both high gas permeability and high gas separation selectivity can be achieved. In practice, the specific resin layer is formed of a mixture of a compound having a siloxane bond and silica; thus it is believed that relatively large voids and relatively small voids are mixed together such that their ratio varies.

To achieve both high gas permeability and high gas separation selectivity, the gas separation membrane according to the fourth embodiment preferably satisfies:

0.88≤X/Y≤0.99 more preferably 0.88≤X/Y≤0.98 particularly preferably 0.88≤X/Y≤0.97 where X is the positron lifetime τ3 of a third component formed by implantation of a positron with an energy of 1 keV into the surface of the specific resin layer, and Y is the positron lifetime τ3 of a third component formed by implantation of a positron with an energy of 3 keV into the surface of the specific resin layer.

At an implantation energy of 1 key, information can be mainly obtained from a position about 20 nm from the surface in the depth direction, and at an implantation energy of 3 keV, information can be mainly obtained from a position about 200 nm from the surface in the depth direction.

If X/Y is within the range of less than 1, higher values of X/Y indicate that more oxygen atoms are permeated into the inner portion of the specific resin layer in the thickness direction. This specific resin layer serves as a layer with high gas separation selectivity, that is, a layer having separation selectivity. Corona treatment and plasma treatment intended only for surface modification for adhesion improvement do not allow sufficient oxygen to enter the specific resin layer from its surface to a sufficient depth so that the specific resin layer has gas separation selectivity.

In the gas separation membrane according to the fourth embodiment, the relative intensity I3 of a third component formed by implantation of a positron with an energy of 1 keV into the surface of the specific resin layer is preferably 13% to 41%, more preferably 13% to 40%, particularly preferably 13% to 39%, more particularly preferably 13% to 33%, to achieve both high gas permeability and high gas separation selectivity.

The relative intensity I3 of a third component indicates void (free-volume hole) porosity. If the relative intensity I3 of a third component formed by implantation of a positron with an energy of 1 keV into the surface of the specific resin layer is, for example, 13% to 41%, the porosity at a position about 20 nm from the surface of the specific resin layer in the depth direction (toward the support) is expected to be 13% to 41%. If the porosity at a position about 20 nm from the surface of the specific resin layer in the depth direction (toward the support) is within such a range, the specific resin layer has a porosity appropriate for separation of $CO_2$ and $CH_4$. As a result, both high gas permeability and high gas separation selectivity can be achieved.

The resin layer containing a compound having a siloxane bond and satisfying the above preferably accounts for 50% or more, more preferably 70% or more, particularly preferably 90% or more, of the plane of the gas separation membrane used in the present invention.

Regions other than the specific resin layer containing a compound having a siloxane bond and satisfying the above may be present in the plane of the gas separation membrane. Examples of such other regions include regions where adhesives, such as pressure-sensitive adhesives, are provided and regions where surface oxidation treatment is insufficient relative to the specific resin layer.

Materials

The resin layer containing a compound having a siloxane bond contains a compound having a siloxane bond. The compound having a siloxane bond may be a "compound having a repeating unit containing at least silicon, oxygen, and carbon atoms". The compound having a siloxane bond may also be a "compound having a siloxane bond and having a repeating unit". In particular, a compound having a polysiloxane unit is preferred.

In the gas separation membrane used in the present invention, the compound having a siloxane bond preferably has a repeating unit represented by general formula (2) and a repeating unit represented by general formula (3):

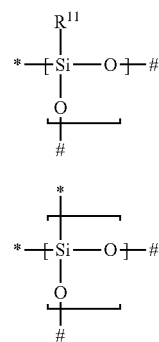

general formula (2)

general formula (3)

where $R^{11}$ represents a substituent, * represents a site linked to # in general formula (2) or (3), and # represents a site linked to * in general formula (2) or (3).

$R^{11}$ in general formula (2) is preferably a hydroxyl group, an alkyl group having 1 or more carbon atoms, an aryl group, an amino group, an epoxy group, or a carboxyl group. $R^{11}$ in general formula (2) is more preferably a hydroxyl group, an alkyl group having 1 or more carbon atoms, an amino group, an epoxy group, or a carboxyl group, particularly preferably a hydroxyl group, an alkyl group having 1 or more carbon atoms, an epoxy group, or a carboxyl group.

The hydroxyl or carboxyl group represented by $R^{11}$ in general formula (2) may form any salt.

In general formulae (2) and (3), * represents a site linked to # in general formula (2) or (3), and # represents a site linked to * in general formula (2) or (3). * may be a site linked to an oxygen atom in general formula (1) below, and # may be a site linked to a silicon atom in general formula (1) below.

In the gas separation membrane used in the present invention, the compound having a siloxane bond preferably has a repeating unit represented by general formula (1):

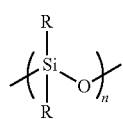

general formula (1)

where R each independently represents a hydrogen atom, an alkyl group having 1 or more carbon atoms, an aryl group, an amino group, an epoxy group, a fluoroalkyl group, a vinyl group, an alkoxy group, or a carboxyl group, and n represents an integer of 2 or more.

If such a compound having a siloxane bond is used as a material for the specific resin layer to form a specific resin layer satisfying inequalities 1 and 2 above, high gas permeability and high gas separation selectivity under high pressure can be achieved.

The case where a compound having a siloxane bond is used as a material for the specific resin layer to form a specific resin layer satisfying inequalities 1 and 2 above will be described.

While not wishing to be bound by any theory, oxygen atoms are incorporated into not only the surface of the specific resin layer but also the inner portion thereof in the thickness direction to form the composition SiOx. It is believed that this results in high gas permeability and gas separation selectivity under high pressure. In particular, high gas permeability and high separation selectivity under high pressure can also be achieved by forming a specific resin layer satisfying inequality 1 above using polydimethylsiloxane, which is known to have high gas permeability. Oxygen atoms are incorporated into not only the surface of the resin layer containing a compound having a siloxane bond but also the inner portion thereof in the thickness direction to form the surface of the resin layer containing a compound having a siloxane bond and the resin layer containing a compound having a siloxane bond. The compound having a siloxane bond in the inner portion of the resin layer containing a compound having a siloxane bond in the thickness direction preferably has the repeating unit represented by general formula (2) and the repeating unit represented by general formula (3).

In general formula (1), R, each independently, is preferably an alkyl group having 1 or more carbon atoms, an aryl group, an amino group, an epoxy group, or a carboxyl group, more preferably an alkyl group having 1 or more carbon atoms, an amino group, an epoxy group, or a carboxyl group, particularly preferably an alkyl group having 1 or more carbon atoms, an epoxy group, or a carboxyl group.

The alkyl group having 1 or more carbon atoms represented by R in general formula (1) is preferably an alkyl group having 1 to 10 carbon atoms, more preferably a methyl group, an ethyl group, or a propyl group, particularly preferably a methyl group. The alkyl group having 1 or more carbon atoms represented by R may be linear, branched, or cyclic.

The aryl group represented by R in general formula (1) is preferably an aryl group having 6 to 20 carbon atoms, particularly preferably a phenyl group.

The fluoroalkyl group represented by R in general formula (1) is preferably a fluoroalkyl group having 1 to 10 carbon atoms, more preferably a fluoroalkyl group having 1 to 3 carbon atoms, particularly preferably a trifluoromethyl group. The fluoroalkyl group represented by R may be linear, branched, or cyclic.

The alkoxy group represented by R in general formula (1) is preferably an alkoxy group having 1 to 10 carbon atoms, more preferably a methoxy group, an ethoxy group, or a propyloxy group, particularly preferably a methoxy group. The alkoxy group having 1 or more carbon atoms represented by R may be linear, branched, or cyclic.

n in general formula (1) represents an integer of 2 or more and is preferably 40 to 800, more preferably 50 to 700, particularly preferably 60 to 500.

Besides the repeating unit represented by general formula (1), the compound having a siloxane bond and having the repeating unit represented by general formula (1) may have any substituent at its molecular ends. Examples and preferred ranges of substituents that the compound having a siloxane bond and having the repeating unit represented by general formula (1) may have at its molecular ends are similar to those of R in general formula (1).

In the gas separation membrane used in the present invention, the surface of the resin layer preferably includes a compound having a siloxane bond and having the repeating unit represented by general formula (1), the repeating unit represented by general formula (2), and the repeating unit represented by general formula (3).

In the gas separation membrane used in the present invention, the percentage of the repeating unit represented by general formula (3) to the repeating unit represented by general formula (2) and the repeating unit represented by general formula (1) in the compound having a siloxane bond contained in the surface of the resin layer is preferably 100 to 600 mol %, more preferably 200 to 600 mol %, particularly preferably 300 to 600 mol %.

In the gas separation membrane used in the present invention, the resin layer preferably contains, at a depth of 10 nm from the surface of the resin layer, a compound having a siloxane bond and having the repeating unit represented by general formula (1), the repeating unit represented by general formula (2), and the repeating unit represented by general formula (3). In the gas separation membrane used in the present invention, the percentage of the repeating unit represented by general formula (3) relative to the repeating unit represented by general formula (2) and the repeating unit represented by general formula (1) in the compound having a siloxane bond contained in the resin layer at a depth of 10 nm from the surface of the resin layer is preferably 3.0 to 500 mol %, more preferably 3.5 to 450 mol %, particularly preferably 4.0 to 400 mol %.

Furthermore, in the gas separation membrane used in the present invention, the resin layer preferably contains, at a depth of 30 nm from the surface of the resin layer, a compound having a siloxane bond and having the repeating unit represented by general formula (1), the repeating unit represented by general formula (2), and the repeating unit represented by general formula (3). In the gas separation membrane used in the present invention, the percentage of the repeating unit represented by general formula (3) relative to the repeating unit represented by general formula (2) and the repeating unit represented by general formula (1) in the compound having a siloxane bond contained in the resin layer at a depth of 30 nm from the surface of the resin layer is preferably 2.0 to 400 mol %, more preferably 2.5 to 350 mol %, particularly preferably 3.0 to 300 mol %.

The compound having a siloxane bond for use in the specific resin layer preferably has a polymerizable functional group. Examples of such functional groups include epoxy, oxetane, carboxyl, amino, hydroxyl, and thiol groups. The specific resin layer more preferably contains a compound having a siloxane bond and having an epoxy group, an oxetane group, a carboxyl group, or any combination thereof. Such a specific resin layer is preferably formed on the support by curing a radiation-curable composition with radiation irradiation.

The compound having a siloxane bond for use in the specific resin layer may be a polymerizable dialkylsiloxane formed from a partially cross-linked radiation-curable composition having a dialkylsiloxane group. The polymerizable dialkylsiloxane is a monomer having a dialkylsiloxane group, a polymerizable oligomer having a dialkylsiloxane group, or a polymer having a dialkylsiloxane group. An example of the dialkylsiloxane group is a group represented by —{O—Si(CH$_3$)$_2$}$_{n2}$— (where n2 is, for example, 1 to 100). Poly(dialkylsiloxane) compounds terminated with vinyl groups are also suitable for use.

The compound having a siloxane bond for use as a material for the specific resin layer preferably contains at least one selected from the group consisting of polydimethylsiloxane (hereinafter also referred to as PDMS), polydiphenylsiloxane, polydi(trifluoropropyl)siloxane, poly[methyl(3,3,3-trifluoropropyl)siloxane], and poly(1-trimethylsilyl-1-propyne) (hereinafter also referred to as PTMSP), more preferably polydimethylsiloxane or poly(1-trimethylsilyl-1-propyne), particularly preferably polydimethylsiloxane.

The compound having a siloxane bond for use as a material for the specific resin layer may be a commercially available material. For example, UV9300 (polydimethylsiloxane (PDMS) available from Momentive Performance Materials Inc.) and X-22-162C (available from Shin-Etsu Chemical Co., Ltd.) are suitable for use as the compound having a siloxane bond for use in the specific resin layer.

Other suitable materials that can be used for the specific resin layer include UV9380C (bis(4-dodecylphenyl)iodonium hexafluoroantimonate available from Momentive Performance Materials Inc.).

The material for the specific resin layer can be prepared as a composition containing an organic solvent when the specific resin layer is formed, and the composition is preferably a curable composition. One non-limiting example of the organic solvent that can be used when the specific resin layer is formed is n-heptane.

Properties

The specific resin layer may have any thickness. For ease of membrane formation, the specific resin layer preferably has a thickness of 0.1 µm or more, more preferably 0.1 to 5 µm, particularly preferably 0.1 to 4 µm, more particularly preferably 0.3 to 3 µm. The thickness of the specific resin layer can be determined by SEM.

The thickness of the specific resin layer can be controlled by adjusting the amount of curable composition applied.

Additional Resin Layer

The gas separation membrane used in the present invention may include an additional resin layer in addition to the above-described specific resin layer.

The resin contained in the additional resin layer may be, but is not limited to, any of the following resins. Specifically, the resin is preferably a compound having a siloxane bond as described above, polyimide, polyamide, cellulose, polyethylene glycol, or polybenzoxazole, more preferably at least one selected from the group consisting of compounds having a siloxane bond as described above, polyimide, polybenzoxazole, and cellulose acetate. Particularly preferably, the gas separation membrane used in the present invention has the above-described resin layer and further has a layer containing a polyimide compound as the additional resin layer.

The polyimide compound is preferably a reactive-group-containing polyimide.

Hereinafter, the case where the resin for the additional resin layer is a reactive-group-containing polyimide may be described as a representative example, but this case is not limitative.

The reactive-group-containing polyimide that can be used in the present invention will hereinafter be described in detail.

In the present invention, the reactive-group-containing polyimide compound is preferably a reactive-group-containing polymer containing a polyimide unit and a repeating unit having a reactive side group (preferably a nucleophilic reactive group, more preferably a carboxyl group, an amino group, or a hydroxyl group).

More specifically, the reactive-group-containing polymer preferably contains at least one repeating unit represented by formula (I) below and at least one repeating unit represented by formula (III-a) or (III-b) below.

Furthermore, the reactive-group-containing polymer more preferably contains at least one repeating unit represented by formula (I) below, at least one repeating unit represented by formula (II-a) or (II-b) below, and at least one repeating unit represented by formula (III-a) or (III-b) below.

The reactive-group-containing polyimide that can be used in the present invention may contain repeating units other than the above repeating units. The number of moles of other repeating units is preferably 20 or less, more preferably 0 to 10, with the total number of moles of the repeating units represented by the formulae mentioned above being 100. Particularly preferably, the reactive-group-containing polyimide that can be used in the present invention is made solely of the repeating units represented by the following formulae.

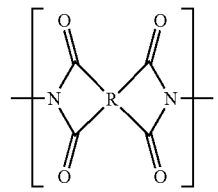

formula (I)

In formula (I), R represents a group having a structure represented by any of formulae (I-a) to (I-h) below. In formulae (I-a) to (I-h) below, * represents a site linked to a carbonyl group in formula (I). R in formula (I) may be referred to as a parent group. The parent group R is preferably a group represented by formula (I-a), (I-b), or (I-d), more preferably a group represented by (I-a) or (I-d), particularly preferably a group represented by (I-a).

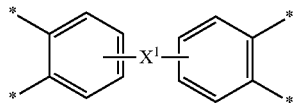
(I-a)

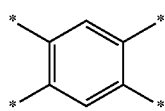
(I-b)

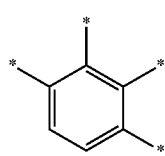
(I-c)

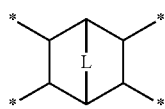
(I-d)

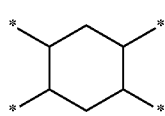
(I-e)

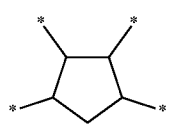
(I-f)

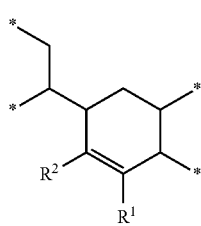
(I-g)

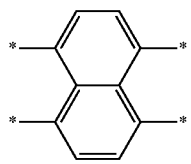
(I-h)

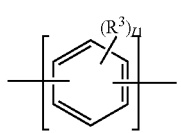
formula (II-a)

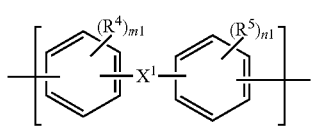
formula (II-b)

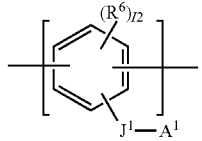
formula (III-a)

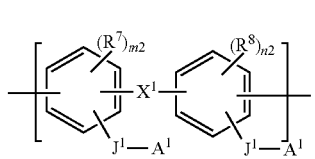
formula (III-b)

$X^1$, $X^2$, and $X^3$ $X^1$, $X^2$, and $X^3$ each represent a single bond or a divalent linking group. The divalent linking group is preferably —C($R^x$)$_2$— (where IV represents a hydrogen atom or a substituent, and if $R^x$ is a substituent, $R^x$ may be linked to each other to form a ring), —O—, —SO$_2$—, —C(=O)—, —S—, —NR$^Y$— (where $R^Y$ is a hydrogen atom, an alkyl group (preferably a methyl group or an ethyl group), or an aryl group (preferably a phenyl group)), or any combination thereof, more preferably a single bond or —C($R^x$)$_2$—. If $R^x$ represents a substituent, specific examples thereof include the substituent group Z described below. In particular, $R^x$ is preferably an alkyl group, more preferably an alkyl group substituted with a halogen atom, particularly preferably trifluoromethyl. The phrase "may be linked to each other to form a ring" as used herein encompasses situations where substituents are linked via a linkage such as a single bond or a double bond to form a ring structure or are fused to form a fused-ring structure.

L

L represents —CH$_2$=CH$_2$— or —CH$_2$—, preferably —CH$_2$=CH$_2$—.

$R^1$ and $R^2$ $R^1$ and $R^2$ each represent a hydrogen atom or a substituent. The substituent may be any one selected from the substituent group Z listed below. $R^1$ and $R^2$ may be linked to each other to form a ring.

$R^1$ and $R^2$ are each preferably a hydrogen atom or an alkyl group, more preferably a hydrogen atom, a methyl group, or an ethyl group, still more preferably a hydrogen atom.

$R^3$ $R^3$ represents an alkyl group or a halogen atom. Preferred alkyl groups and halogen atoms are as defined in the substituent group Z below. l1, which represents the number of $R^3$ groups, is an integer of 0 to 4, preferably 1 to 4, more preferably 3 or 4. $R^3$ is preferably an alkyl group, more preferably a methyl group or an ethyl group.

$R^4$ and $R^5$ $R^4$ and $R^5$ each represent an alkyl group or a halogen atom. Alternatively, $R^4$ and $R^5$ represent groups linked to each other to form a ring with $X^2$. Preferred alkyl groups and halogen atoms are as defined in the substituent group Z below. Although $R^4$ and $R^5$ may be linked via any structure, they are preferably linked via a single bond, —O—, or —S—. m1 and n1, which represent the number of $R^4$ groups and the number of $R^5$ groups, respectively, are each an integer of 0 to 4, preferably 1 to 4, more preferably 3 or 4.

If $R^4$ and $R^5$ are each an alkyl group, the alkyl group is preferably a methyl group or an ethyl group. Trifluoromethyl is also preferred.

$R^6$, $R^7$, and $R^8$ $R^6$, $R^7$, and $R^8$ each represent a substituent. $R^7$ and $R^8$ may be linked to each other to form a ring. l2, m2, and n2, which represent the numbers of substituents, are each an integer of 0 to 4, preferably 0 to 2, more preferably 0 or 1.

$J^1$ $J^1$ represents a single bond or a divalent linking group. The linking group may represent *—COO$^-$N$^+$R$^b$R$^c$R$^d$—** (where $R^b$ to $R^d$ each represent a hydrogen atom, an alkyl group, or an aryl group, and preferred ranges thereof are as defined in the substituent group Z described below), *—SO$_3$$^-$N$^+$R$^e$R$^f$R$^g$—** (where $R^e$ to $R^g$ each represent a hydrogen atom, an alkyl group, or an aryl group, and preferred ranges thereof are as defined in the substituent group Z described below), an alkylene group, or an arylene group. * represents a linking site on the phenylene group side, and ** represents a linking site on the opposite side. $J^1$ is preferably a single bond, a methylene group, or a phenylene group, particularly preferably a single bond.

$A^1$

Although $A^1$ may be any crosslinkable group, $A^1$ is preferably a nucleophilic reactive group, more preferably a group selected from the group consisting of carboxyl, amino, hydroxyl, and —S(=O)$_2$OH groups. Preferred ranges of amino groups are as defined in the substituent group Z described below. $A^1$ is particularly preferably a carboxyl group, an amino group, or a hydroxyl group, more particularly preferably a carboxyl group or a hydroxyl group, particularly preferably a carboxyl group.

Substituent Group Z

Examples of substituents include alkyl groups (preferably alkyl groups having 1 to 30 carbon atoms, more preferably 1 to 20 carbon atoms, particularly preferably 1 to 10 carbon atoms, such as methyl, ethyl, iso-propyl, tert-butyl, n-octyl, n-decyl, and n-hexadecyl), cycloalkyl groups (preferably cycloalkyl groups having 3 to 30 carbon atoms, more preferably 3 to 20 carbon atoms, particularly preferably 3 to 10 carbon atoms, such as cyclopropyl, cyclopentyl, and cyclohexyl), alkenyl groups (preferably alkenyl groups having 2 to 30 carbon atoms, more preferably 2 to 20 carbon atoms, particularly preferably 2 to 10 carbon atoms, such as vinyl, allyl, 2-butenyl, and 3-pentenyl), alkynyl groups (preferably alkynyl groups having 2 to 30 carbon atoms, more preferably 2 to 20 carbon atoms, particularly preferably 2 to 10 carbon atoms, such as propargyl and 3-pentynyl), aryl groups (preferably aryl groups having 6 to 30 carbon atoms, more preferably 6 to 20 carbon atoms, particularly preferably 6 to 12 carbon atoms, such as phenyl, p-methylphenyl, naphthyl, and anthranyl), amino groups (including amino, alkylamino, arylamino, and heterocyclic amino groups, preferably amino groups having 0 to 30 carbon atoms, more preferably 0 to 20 carbon atoms, particularly preferably 0 to 10 carbon atoms, such as amino, methylamino, dimethylamino, diethylamino, dibenzylamino, diphenylamino, and ditolylamino), alkoxy groups (preferably alkoxy groups having 1 to 30 carbon atoms, more preferably 1 to 20 carbon atoms, particularly preferably 1 to 10 carbon atoms, such as methoxy, ethoxy, butoxy, and 2-ethylhexyloxy), aryloxy groups (preferably aryloxy groups having 6 to 30 carbon atoms, more preferably 6 to 20 carbon atoms, particularly preferably 6 to 12 carbon atoms, such as phenyloxy, 1-naphthyloxy, and 2-naphthyloxy), and heterocyclic oxy groups (preferably heterocyclic oxy groups having 1 to 30 carbon atoms, more preferably 1 to 20 carbon atoms, particularly preferably 1 to 12 carbon atoms, such as pyridyloxy, pyrazyloxy, pyrimidyloxy, and quinolyloxy).

Other examples of substituents include acyl groups (preferably acyl groups having 1 to 30 carbon atoms, more preferably 1 to 20 carbon atoms, particularly preferably 1 to 12 carbon atoms, such as acetyl, benzoyl, formyl, and pivaloyl), alkoxycarbonyl groups (preferably alkoxycarbonyl groups having 2 to 30 carbon atoms, more preferably 2 to 20 carbon atoms, particularly preferably 2 to 12 carbon atoms, such as methoxycarbonyl and ethoxycarbonyl), aryloxycarbonyl groups (preferably aryloxycarbonyl groups having 7 to 30 carbon atoms, more preferably 7 to 20 carbon atoms, particularly preferably 7 to 12 carbon atoms, such as phenyloxycarbonyl), acyloxy groups (preferably acyloxy groups having 2 to 30 carbon atoms, more preferably 2 to 20 carbon atoms, particularly preferably 2 to 10 carbon atoms, such as acetoxy and benzoyloxy), and acylamino groups (preferably acylamino groups having 2 to 30 carbon atoms, more preferably 2 to 20 carbon atoms, particularly preferably 2 to 10 carbon atoms, such as acetylamino and benzoylamino).

Other examples of substituents include alkoxycarbonylamino groups (preferably alkoxycarbonylamino groups having 2 to 30 carbon atoms, more preferably 2 to 20 carbon atoms, particularly preferably 2 to 12 carbon atoms, such as methoxycarbonylamino), aryloxycarbonylamino groups (preferably aryloxycarbonylamino groups having 7 to 30 carbon atoms, more preferably 7 to 20 carbon atoms, particularly preferably 7 to 12 carbon atoms, such as phenyloxycarbonylamino), sulfonylamino groups (preferably having 1 to 30 carbon atoms, more preferably 1 to 20 carbon atoms, particularly preferably 1 to 12 carbon atoms, such as methanesulfonylamino and benzenesulfonylamino), and sulfamoyl groups (preferably sulfamoyl groups having 0 to 30 carbon atoms, more preferably 0 to 20 carbon atoms, particularly preferably 0 to 12 carbon atoms, such as sulfamoyl, methylsulfamoyl, dimethylsulfamoyl, and phenylsulfamoyl).

Other examples of substituents include carbamoyl groups (preferably carbamoyl groups having 1 to 30 carbon atoms, more preferably 1 to 20 carbon atoms, particularly preferably 1 to 12 carbon atoms, such as carbamoyl, methylcarbamoyl, diethylcarbamoyl, and phenylcarbamoyl), alkylthio groups (preferably alkylthio groups having 1 to 30 carbon atoms, more preferably 1 to 20 carbon atoms, particularly preferably 1 to 12 carbon atoms, such as methylthio and ethylthio), arylthio groups (preferably arylthio groups having 6 to 30 carbon atoms, more preferably 6 to 20 carbon atoms, particularly preferably arylthio groups having 6 to 12 carbon atoms, such as phenylthio), and heterocyclic thio groups (preferably heterocyclic thio groups having 1 to 30 carbon atoms, more preferably 1 to 20 carbon atoms, particularly preferably 1 to 12 carbon atoms, such as pyridylthio, 2-benzimidazolylthio, 2-benzoxazolylthio, and 2-benzothiazolylthio).

Other examples of substituents include sulfonyl groups (preferably sulfonyl groups having 1 to 30 carbon atoms, more preferably 1 to 20 carbon atoms, particularly preferably 1 to 12 carbon atoms, such as mesyl and tosyl), sulfinyl groups (preferably sulfinyl groups having 1 to 30 carbon atoms, more preferably 1 to 20 carbon atoms, particularly preferably sulfinyl groups having 1 to 12 carbon atoms, such as methanesulfinyl and benzenesulfinyl), ureido groups (preferably ureido groups having 1 to 30 carbon atoms, more preferably 1 to 20 carbon atoms, particularly preferably 1 to 12 carbon atoms, such as ureido, methylureido, and phenylureido), phosphoramide groups (preferably phosphoramide groups having 1 to 30 carbon atoms, more preferably 1 to 20 carbon atoms, particularly preferably 1 to 12 carbon atoms, such as diethylphosphoramide and phenylphosphoramide), hydroxyl groups, mercapto groups, and halogen atoms (such as fluorine atoms, chlorine atoms, bromine atoms, and iodine atoms, more preferably fluorine atoms).

Other examples of substituents include cyano groups, sulfo groups, carboxyl groups, oxo groups, nitro groups, hydroxamic acid groups, sulfino groups, hydrazino groups, imino groups, heterocyclic groups (preferably 3- to 7-membered heterocyclic groups in which the heterocycle may be an aromatic or non-aromatic heterocycle and may have a heteroatom such as a nitrogen atom, an oxygen atom, or a sulfur atom, preferably heterocyclic groups having 0 to 30 carbon atoms, more preferably 1 to 12 carbon atoms, specific examples including imidazolyl, pyridyl, quinolyl, furyl, thienyl, piperidyl, morpholino, benzoxazolyl, benzimidazolyl, benzothiazolyl, carbazolyl, and azepinyl), silyl groups (preferably silyl groups having 3 to 40 carbon atoms, more preferably 3 to 30 carbon atoms, particularly preferably 3 to 24 carbon atoms, such as trimethylsilyl and triphenylsilyl), and silyloxy groups (preferably silyloxy groups having 3 to 40 carbon atoms, more preferably 3 to 30 carbon atoms, particularly preferably 3 to 24 carbon atoms, such as trimethylsilyloxy and triphenylsilyloxy). These substituents may be further substituted with one or more substituents selected from the substituent group Z listed above.

In the present invention, if one structural segment has a plurality of substituents, these substituents may be linked to each other to form a ring or may be fused with a portion or the whole of the structural segment to form an aromatic ring or an unsaturated heterocyclic ring.

In the polyimide compound that can be used in the present invention, the ratio of the repeating units represented by formulae (I), (II-a), (II-b), (III-a), and (III-b) above may be any ratio that is appropriately adjusted depending on the purpose of gas separation (e.g., recovery and purity) by taking into account gas permeability and gas separation selectivity.

In the reactive-group-containing polyimide that can be used in the present invention, the ratio ($E_{II}/E_{III}$) of the total number of moles ($E_{II}$) of the repeating units of formulae (II-a) and (II-b) to the total number of moles ($E_{III}$) of the repeating units of formulae (III-a) and (III-b) is preferably 5/95 to 95/5, more preferably 10/90 to 80/20, still more preferably 20/80 to 60/40.

The reactive-group-containing polyimide that can be used in the present invention preferably has a weight average molecular weight of 10,000 to 1,000,000, more preferably 15,000 to 500,000, still more preferably 20,000 to 200,000.

Unless otherwise specified, the molecular weight and the dispersity are determined by gel permeation chromatography (GPC), and the molecular weight is the weight average molecular weight based on polystyrene. The gel packed into the columns used in GPC is preferably a gel having an aromatic compound as a repeating unit, for example, a styrene-divinylbenzene copolymer gel. Preferably, two to six columns connected together are used. Examples of solvents for use include ether solvents such as tetrahydrofuran and amide solvents such as N-methylpyrrolidinone. In the measurement, the solvent flow rate is preferably in the range of 0.1 to 2 mL/min, most preferably in the range of 0.5 to 1.5 mL/min. Within this range, the measurement can be more efficiently carried out without a substantial load on the apparatus. The measurement temperature is preferably 10° C. to 50° C., most preferably 20° C. to 40° C. The columns and carrier used can be appropriately selected depending on the physical properties of the polymer compound to be analyzed.

The reactive-group-containing polyimide that can be used in the present invention can be synthesized by condensation polymerization of a particular difunctional acid anhydride (tetracarboxylic dianhydride) and a particular diamine. Synthesis methods described in common books (e.g., "Latest Polyimides—Fundamentals and Applications—", published by NTS Inc., written and edited by Yoshio Imai and Rikio Yokota, pp. 3 to 49) can be appropriately selected.

Preferred specific examples of reactive-group-containing polyimides that can be used in the present invention are given below, although the present invention is not limited to these examples. In the following formulae, "100", "x", and "y" represent copolymerization ratios (molar ratios). The table below shows examples of "x", "y", and weight average molecular weights. In the polyimide compound that can be used in the present invention, y is preferably not 0.

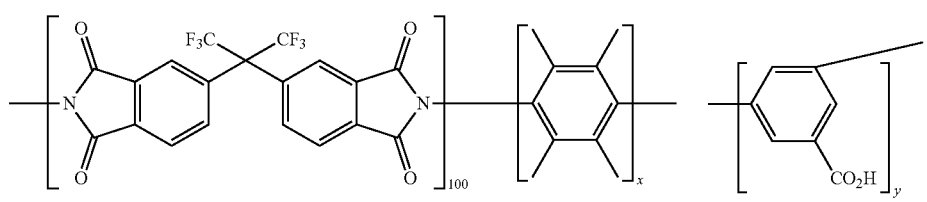

(P-100)

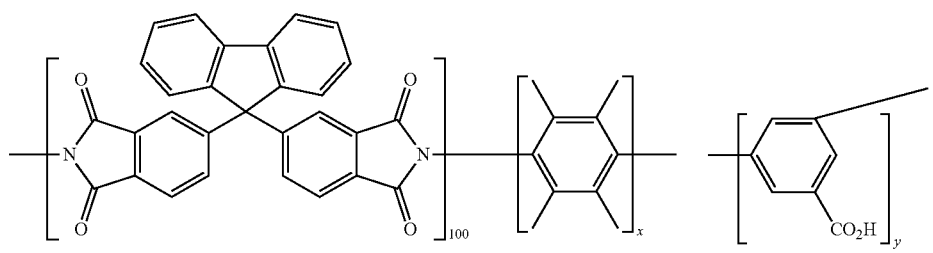

(P-200)

-continued
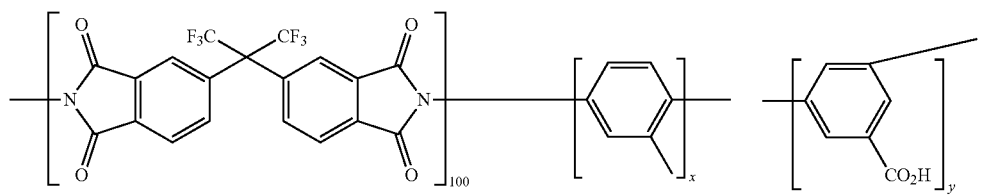
(P-300)
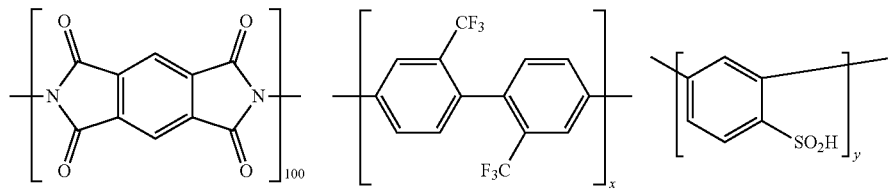
(P-400)
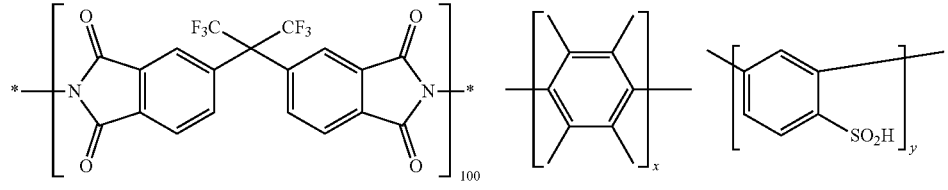
(P-500)
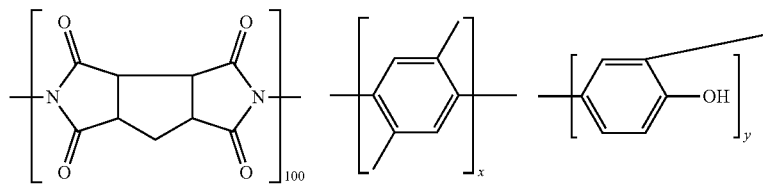
(P-600)
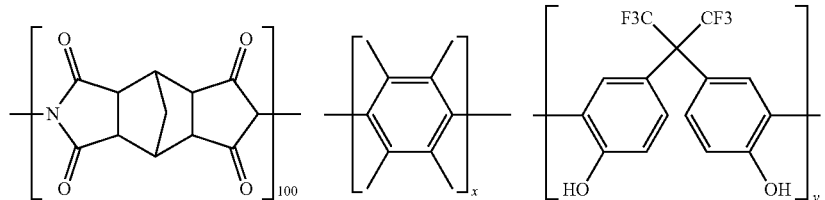
(P-700)
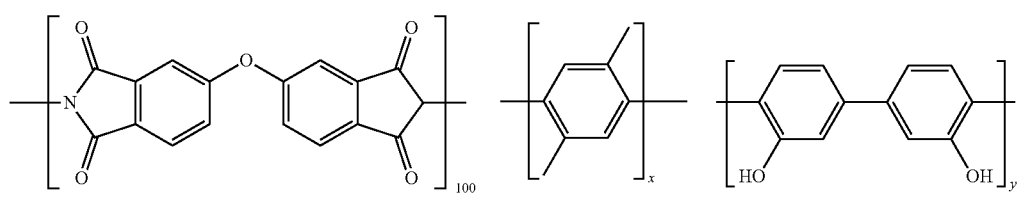
(P-800)
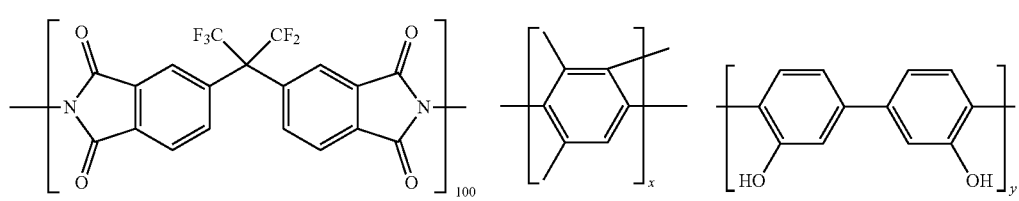
(P-900)
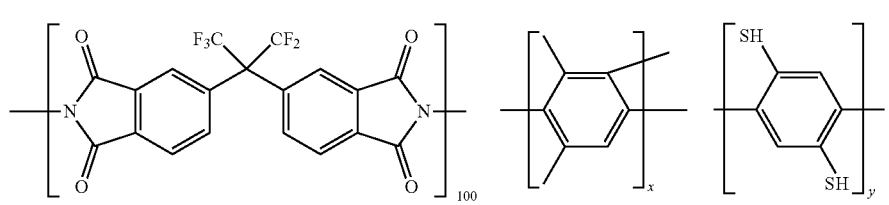
(P-1000)

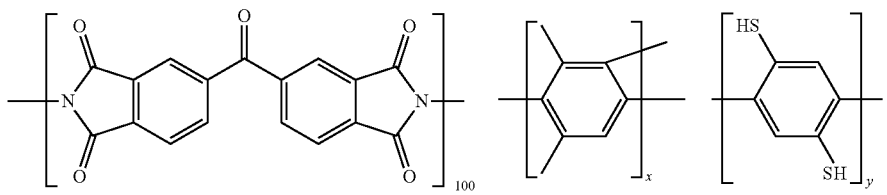

(P-1100)

TABLE 1

| Polymer | Copolymerization ratio | | Weight average molecular weight |
|---|---|---|---|
| | x | y | |
| P-100 | 30 | 70 | 132,000 |
| P-200 | 40 | 60 | 168,000 |
| P-300 | 60 | 40 | 165,000 |
| P-400 | 10 | 90 | 158,000 |
| P-500 | 20 | 80 | 128,000 |
| P-600 | 50 | 50 | 155,000 |
| P-700 | 70 | 30 | 112,500 |
| P-800 | 30 | 70 | 158,000 |
| P-900 | 20 | 80 | 128,000 |
| P-1000 | 60 | 40 | 150,000 |
| P-1100 | 40 | 60 | 117,000 |

Polymer (P-101), which is Exemplary Polyimide Compound P-100 above where the copolymerization ratio of x to y is 20:80, is also suitable for use.

More specifically, if the resin for the additional resin layer is polyimide, products such as Matrimid 5218 marketed by Huntsman Advanced Materials under the trademark Matrimid (registered trademark) and P84 are P84HT marketed by HP Polymers GmbH under the trade names P84 and P84HT, respectively, are also preferred.

Examples of resins other than polyimide that can be selected for the additional resin layer include celluloses such as cellulose acetate, cellulose triacetate, cellulose acetate butyrate, cellulose propionate, ethylcellulose, methylcellulose, and nitrocellulose. The cellulose that can be used for the additional resin layer preferably has a total degree of acyl substitution of 2.0 to 2.7. Cellulose acetate marketed under the name Cellulose Acetate L-40 (degree of acyl substitution: 2.5, available from Daicel Corporation) is also suitable for use.

Other examples of resins that can be selected for the additional resin layer include polyethylene glycols such as polymers of polyethylene glycol 200 diacrylate (available from Shin-Nakamura Chemical Co., Ltd.) and polymers described in JP2010-513021A.

Another additional resin layer may be interposed between the support and the specific resin layer. An example of the other additional resin layer is polyvinyl alcohol (PVA).

The additional resin layer is preferably as thin as possible under conditions that provide high gas permeability while maintaining its mechanical strength and gas separation selectivity.

To increase gas permeability, the additional resin layer other than the specific resin layer of the gas separation membrane used in the present invention is preferably a thin layer. The additional resin layer other than the specific resin layer typically has a thickness of 10 μm or less, preferably 3 μm or less, particularly preferably 1 μm or less, more particularly preferably 0.3 μm or less, still more particularly preferably 0.2 μm or less.

The additional resin layer other than the specific resin layer typically has a thickness of 0.01 μm or more. In practice, for ease of membrane formation, the thickness is preferably 0.03 μm or more, more preferably 0.1 μm or more.

Protective Layer

The protective-layer-covered gas separation membrane according to the present invention has a protective layer located on the specific resin layer of the gas separation membrane.

The protective layer is preferably a layer different from the specific resin layer of the gas separation membrane.

The protective layer of the protective-layer-covered gas separation membrane according to the present invention is preferably adjacent to the porous layer described later.

In the protective-layer-covered gas separation membrane, the protective layer preferably includes a region PLi present in the porous layer and a region PLe present on the porous layer, and it is preferable to control the degree of infiltration of the protective layer into the porous layer, the degree of infiltration being expressed by the following formula.

Degree of infiltration of protective layer into porous layer=100%×(thickness of $PLi$)/(thickness of $PLi$+thickness of $PLe$)

To provide good abrasion resistance and good bending resistance, the degree of infiltration of the protective layer into the porous layer is preferably 95% or less.

In the protective-layer-covered gas separation membrane according to the present invention, to produce an anchoring effect of the protective layer to the porous layer to thereby provide good abrasion resistance and good bending resistance, the protective layer preferably includes the region PLi present in the porous layer and the region PLe present on the porous layer, and the degree of infiltration, expressed by the above formula, of the protective layer into the porous layer is preferably 10% to 90%. Specifically, to provide good abrasion resistance, the degree of infiltration of the protective layer into the porous layer is preferably 10% or more, more preferably 12% or more, particularly preferably 15% or more. To provide better abrasion resistance, the degree of infiltration of the protective layer into the porous layer is preferably 90% or less, particularly preferably 85% or less.

Figure 9:
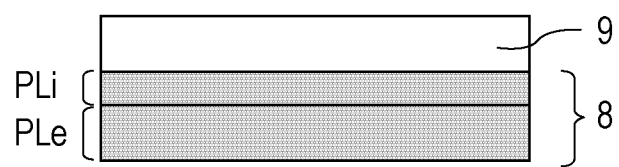
FIG. 9 is a schematic view of an exemplary protective layer and an exemplary porous layer used in a protective-layer-covered gas separation membrane according to the present invention.

Preferred embodiments of the protective layer and the porous layer used in the protective-layer-covered gas separation membrane according to the present invention will be described with reference to the drawings. FIG. 9 is a schematic view of an exemplary protective layer and an exemplary porous layer used in the protective-layer-covered gas separation membrane according to the present invention. As shown in FIG. 9, the protective layer 8 is preferably adjacent to the porous layer 9 (a portion not filled with the protective layer). As also shown in FIG. 9, the protective layer 8 preferably includes the region PLi present in the porous layer (the porous layer before the infiltration of the protective layer: formally referred to as a porous layer b) and the region PLe present on the porous layer (porous layer b).

The protective layer may be located at any position as long as the gas separation membrane, the protective layer, and the porous layer are disposed in this order. The protective-layer-covered gas separation membrane may include a protective layer formed on the additional resin layer.

The protective layer may be made of any material. Examples of materials that may be used for the protective layer include those listed as examples of resins that may be contained in the additional resin layer. Examples include silicone resins (including those that may be used for the specific resin layer), polyimides, cellulose resins, and polyethylene oxides.

The protective layer may also include a filler. The filler used for the protective layer may be any filler. For example, inorganic particles described in [0020] to [0027] in JP2015-160201A, the contents of which are hereby incorporated by reference, are suitable for use as the filler used for the protective layer.

In the protective-layer-covered gas separation membrane according to the present invention, to improve the initial gas permeation performance and abrasion resistance, the protective layer preferably contains a silicone resin. In this case, also to increase the adhesion between the protective layer and the oxidation-treated surface of the specific resin layer of the gas separation membrane, the silicone resin preferably accounts for 50% by mass or more, more preferably 90% by mass or more, particularly preferably 99% by mass or more, of the protective layer. More particularly preferably, the protective layer is made of a silicone resin.

An example of the silicone resin used for the protective layer is a resin having a D structure (also referred to as D resin) represented by general formula D below, a T structure (also referred to as T resin) represented by general formula T below, an M structure (also referred to as M resin) represented by formula M below, and a Q structure (also referred to as Q resin) represented by formula Q below, in any copolymerization ratio.

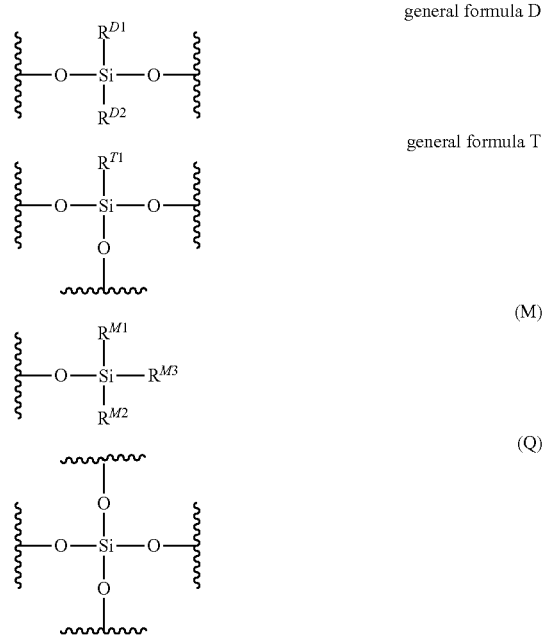

In general formulae T and D, $R^{D1}$, $R^{D2}$, and $R^{T1}$ each independently represent a hydrogen atom or a substituent, preferably a methyl group, a substituted or unsubstituted phenyl group, or a substituted or unsubstituted benzyl group, more preferably a methyl group or a substituted or unsubstituted phenyl group, particularly preferably a methyl group or a phenyl group; and each wavy line represents a site linked to another structure.

In formulae M and Q, $R^{M1}$, $R^{M2}$, and $R^{M3}$ each independently represent a hydrogen atom or a substituent, preferably an alkyl group, an aryl group, an allyl group, or a hydrogen atom, more preferably an alkyl group or an aryl group, particularly preferably an alkyl group having 1 to 4 carbon atoms, a phenyl group, or a naphthyl group, still more preferably a methyl group or a phenyl group; and each wavy line represents a site linked to another structure.

The silicone resin can be produced, for example, by hydrolyzing a silane compound having a hydrolyzable group to form silanol groups and then condensing the silanol groups by heating.

The hydrolyzable group is, for example, an alkoxy group or a halogen atom, preferably an alkoxy group having 1 to 4 carbon atoms or a chlorine atom.

To produce a silicone resin containing the structure represented by general formula T above and the structure represented by general formula D above, it is preferable to condense a silane compound having three hydrolyzable groups that can form the structure represented by general formula T above after condensation and a silane compound having two hydrolyzable groups that can form the structure represented by general formula D above after condensation. To produce a silicone resin containing the structure represented by formula M above or the structure represented by formula Q above, it is preferable to condense a silane compound having one hydrolyzable group or a silane compound having four hydrolyzable groups.

In the protective-layer-covered gas separation membrane according to the present invention, to improve initial gas permeation performance and gas permeation performance after an abrasion resistance test, the silicone resin used for the protective layer more preferably contains a $Si^{4+}$ component, particularly preferably Q resin.

The silicone resin used for the protective layer is particularly preferably at least one selected from the group consisting of Q-resin-containing polydimethylsiloxane, polydimethylsiloxane, and poly(1-trimethylsilyl-1-propyne), more particularly preferably Q-resin-containing polydimethylsiloxane.

In the protective-layer-covered gas separation membrane, to improve initial gas permeation performance and gas permeation performance after an abrasion resistance test, the O/Si ratio that is the ratio of the number of oxygen atoms to the number of silicon atoms in an inner portion of the protective layer is preferably less than 1.65, more preferably 1.00 to 1.60, particularly preferably 1.00 to 1.40.

Preferred embodiments of the silicone resin used for the protective layer are the same as preferred embodiments of a silicone resin used for a resin layer precursor containing a siloxane bond. In particular, polydimethylsiloxane is suitable for use. If the same material as that for the resin layer precursor containing a siloxane bond is used as a material for the protective layer, the composition of the protective layer not subjected to surface oxidation treatment may be different from the composition of the specific resin layer that has been subjected to surface oxidation treatment. The "inner portion" of the protective layer means a portion extending from the surface of the resin layer containing a compound having a siloxane bond toward the side facing away from the support. The "inner portion" of the protective layer preferably includes a portion where the O/Si ratio is less than 1.7.

In the protective-layer-covered gas separation membrane, the protective layer may contain a polyimide resin.

Examples of polyimide resins that can be used for the protective layer those used for the additional resin layer.

The protective layer preferably has a thickness of 200 to 3,000 nm, more preferably 300 to 2,500 nm, particularly preferably 400 to 2,000 nm.

Porous Layer

The protective-layer-covered gas separation membrane according to the present invention has a porous layer (a porous layer on the protective layer side).

The porous layer means a layer that, when formed as a membrane having a thickness of 0.1 to 30 μm, has a carbon dioxide permeability coefficient ($PCO_2$) of 2,000 barrers or more when pure carbon dioxide ($CO_2$) gas is fed to the resulting membrane at a temperature of 40° C. with the total pressure on the gas feed side set to 0.5 MPa.

The porous layer (the porous layer on the protective layer side) may be made of any material. The same material as that for the porous layer used for the support may be used.

Characteristics and Applications

The protective-layer-covered gas separation membrane according to the present invention is suitable for use in gas separation and recovery methods and gas separation and purification methods. For example, the protective-layer-covered gas separation membrane according to the present invention can be used as a gas separation membrane capable of efficiently separating a specific gas from a gas mixture containing gases such as hydrogen, helium, carbon monoxide, carbon dioxide, hydrogen sulfide, oxygen, nitrogen, ammonia, sulfur oxides, nitrogen oxides, hydrocarbons such as methane and ethane, unsaturated hydrocarbons such as propylene, and perfluoro compounds such as tetrafluoroethane.

The protective-layer-covered gas separation membrane according to the present invention is preferably a gas separation membrane for separating at least one acidic gas from a gas mixture of acidic and nonacidic gases. Examples of acidic gases include carbon dioxide, hydrogen sulfide, carbonyl sulfide, sulfur oxides ($SO_x$), and nitrogen oxides ($NO_x$). Preferably, the acidic gas is at least one selected from the group consisting of carbon dioxide, hydrogen sulfide, carbonyl sulfide, sulfur oxides ($SO_x$), and nitrogen oxides ($NO_x$), more preferably carbon dioxide, hydrogen sulfide, or a sulfur oxide ($SO_x$), particularly preferably carbon dioxide.

The nonacidic gas mentioned above is preferably at least one selected from the group consisting of hydrogen, methane, nitrogen, and carbon monoxide, more preferably methane or hydrogen, particularly preferably methane.

In particular, the protective-layer-covered gas separation membrane according to the present invention is preferably a gas separation membrane that selectively separates carbon dioxide from a gas mixture containing carbon dioxide and a hydrocarbon (methane).

If the gas to be separated is a mixed gas of carbon dioxide and methane, the permeation rate of carbon dioxide at 30° C. and 5 MPa is preferably 10 GPU or more, more preferably 10 to 300 GPU, particularly preferably 15 to 300 GPU.

Here, 1 GPU equals $1 \times 10^{-6}$ cm$^3$ (STP)/cm$^2$·sec·cmHg.

If the gas separated by the protective-layer-covered gas separation membrane according to the present invention is a mixed gas of carbon dioxide and methane, the gas separation selectivity α, which is the ratio of the permeation flux of carbon dioxide to the permeation flux of methane at 30° C. and 5 MPa, is preferably 30 or more, more preferably 35 or more, particularly preferably 40 or more, more particularly preferably more than 50.

The mechanism of dissolution and diffusion into the membrane is believed to contribute to the selective gas permeation described above. From this viewpoint, separation membranes containing polyethyleneoxy (PEO) compositions have been studied (see Journal of Membrane Science, 1999, Vol. 160, pp. 87-99) since carbon dioxide interacts strongly with polyethyleneoxy compositions. Polyethyleneoxy membranes are flexible rubbery polymer membranes with low glass transition temperatures; therefore, there is only a small difference in diffusion coefficient between gas species, and the gas separation selectivity is mainly due to the effect of the difference in the degree of solubility. In contrast, according to preferred embodiments of the present invention, the compound having a siloxane bond in the resin layer has a high glass transition temperature and thus provides the dissolution and diffusion effect described above while significantly improving the thermal durability of the membrane.

Method for Separating Gas Mixture

The protective-layer-covered gas separation membrane according to the present invention can be used to separate a gas mixture.

In the method for separating a gas mixture using the protective-layer-covered gas separation membrane according to the present invention, the gas mixture used as a feedstock is not limited to any particular composition since the composition depends on factors such as the origin of the feedstock, the application, and the use environment. In the method for separating a gas mixture using the protective-layer-covered gas separation membrane according to the present invention, the major components of the gas mixture are preferably carbon dioxide and methane, carbon dioxide and nitrogen, or carbon dioxide and hydrogen.

Specifically, the percentage of carbon dioxide in a gas mixture of carbon dioxide and methane or of carbon dioxide and hydrogen is preferably 5% to 50%, more preferably 10% to 40%. In particular, the method for separating a gas mixture using the protective-layer-covered gas separation membrane according to the present invention provides superior performance if an acidic gas such as carbon dioxide or hydrogen sulfide coexists in the gas mixture. Preferably, the method for separating a gas mixture using the protective-layer-covered gas separation membrane according to the present invention provides superior performance in the separation of carbon dioxide and a hydrocarbon such as methane, of carbon dioxide and nitrogen, or of carbon dioxide and hydrogen.

The method for separating a gas mixture is preferably a method including selective permeation of carbon dioxide from a mixed gas containing carbon dioxide and methane. The pressure during gas separation is preferably 3 MPa to 10 MPa, more preferably 4 MPa to 7 MPa, particularly preferably 5 MPa to 7 MPa. The gas separation temperature is preferably −30° C. to 90° C., more preferably 15° C. to 70° C.

Method for Producing Protective-Layer-Covered Gas Separation Membrane

The protective-layer-covered gas separation membrane according to the present invention may be produced by any method. In particular, "a method for producing a protective-layer-covered gas separation membrane" according to the present invention below (hereinafter also referred to as a production method according to the present invention) is suitable for use.

"The method for producing a protective-layer-covered gas separation membrane" according to the present invention is a method for producing "the protective-layer-covered gas separation membrane according to the present invention" and includes a step of laminating a layered body of the porous layer and the protective layer to the specific resin layer of the gas separation membrane.

A preferred embodiment of the method for producing the protective-layer-covered gas separation membrane according to the present invention will be described below.

Formation of Resin Layer Precursor Containing Siloxane Bond

The method for producing a protective-layer-covered gas separation membrane preferably includes a step of forming a resin layer precursor containing a siloxane bond on the support.

Although the resin layer precursor containing a siloxane bond may be formed on the support by any method, it is preferred to apply a composition containing a material for the resin layer precursor containing a siloxane bond and an organic solvent.

If the gas separation membrane according to the second embodiment is produced, the solid content (viscosity) of the composition is preferably 1% to 50% by mass, more preferably 2% to 40% by mass, particularly preferably 3% to 30% by mass. A higher solid content of the composition tends to result in a thinner GLi.

If the gas separation membrane according to the second embodiment is produced, the amount of the composition dropped is preferably 0.001 to 1 mL/cm$^2$, more preferably 0.002 to 0.5 mL/cm$^2$, particularly preferably 0.005 to 0.3 mL/cm$^2$. A smaller amount of the composition dropped tends to result in a thinner GLi.

The composition may be applied by any known method. For example, spin coating, dip coating, or bar coating may be used as appropriate. If a gas separation membrane according to the second embodiment is produced, the rotational speed for spin coating is preferably 100 to 10,000 rpm (revolutions per minute), more preferably 500 to 9,000 rpm, particularly preferably 700 to 8,000 rpm. A higher rotational speed for spin coating tends to result in a thinner GLi.

The composition containing the material for the resin layer precursor containing a siloxane bond and the organic solvent is preferably a curable composition. If the gas separation membrane according to the second embodiment is produced, the time from the application to the curing of the composition is preferably 0.01 to 60 minutes, more preferably 0.02 to 50 minutes, particularly preferably 0.03 to 30 minutes. A shorter time from the application to the curing of the composition tends to result in a thinner GLi.

Although the curable composition may be irradiated with radiation by any method to form the specific resin layer, electron beam, ultraviolet (UV), visible, or infrared irradiation may be used and may be selected as appropriate depending on the material used.

The radiation irradiation time is preferably 1 to 30 seconds.

The radiation energy (radiation intensity) is preferably 10 to 2,000 mW/cm$^2$.

To increase the gel fraction of the gas separation membrane, the total dose of light (total dose of radiation energy) is preferably more than 0.05 J/cm$^2$ (UV-A), more preferably more than 0.1 J/cm$^2$ (UV-A), particularly preferably 0.1 to 60 J/cm$^2$ (UV-A), more particularly preferably 0.1 to 5 J/cm$^2$ (UV-A).

Surface Oxidation Treatment Step

The method for producing a protective-layer-covered gas separation membrane preferably includes a step of performing surface oxidation treatment on the resin layer precursor containing a siloxane bond before surface oxidation treatment to obtain a gas separation membrane that satisfies one of conditions 1 to 4.

Preferably, the method for producing a protective-layer-covered gas separation membrane according to the present invention includes a step of performing surface oxidation treatment (preferably, specific treatment for permeation of oxygen atoms, i.e., oxygen atom permeation treatment) on the resin layer precursor containing a siloxane bond (preferably on one surface thereof).

The surface oxidation treatment may be performed by any method. In the first to fourth embodiments, the surface oxidation treatment performed in the method for producing a protective-layer-covered gas separation membrane is preferably atmospheric-pressure plasma treatment, ultraviolet ozone treatment, corona discharge treatment, or low-pressure plasma treatment.

A preferred example of a method for surface oxidation treatment is to perform plasma treatment, such as atmospheric-pressure plasma treatment or low-pressure plasma treatment, on one surface of the resin layer precursor containing a siloxane bond. Preferred methods for plasma treatment in the first to fourth embodiments will now be described.

In the first embodiment, it is more preferred to perform the specific treatment until A/B above satisfies inequality 1 above.

The method for producing a gas separation membrane according to the first embodiment preferably includes a surface oxidation treatment step of allowing oxygen atoms to permeate into the resin layer precursor containing a siloxane bond.

The surface oxidation treatment step preferably involves plasma treatment with a carrier gas at an oxygen flow rate of 10 cm$^3$ (STP; STP is an acronym for standard temperature and pressure)/min or more and an input power of 23 W or more.

For example, the plasma treatment may be performed for 5 to 30 seconds under the following conditions:

Plasma treatment conditions: an oxygen flow rate of 10 cm$^3$ (STP)/min or more, an argon flow rate of 100 cm$^3$ (STP)/min, and an input power (discharge power) of 23 W or more.

To improve the gas separation selectivity and to improve the abrasion resistance so that the gas separation selectivity is less likely to decrease, the plasma treatment is more preferably performed under the conditions described above for 5 seconds or more, particularly preferably 10 seconds or more, more particularly preferably 20 seconds or more.

On the other hand, the plasma treatment is preferably performed under the conditions described above for 1,000 seconds or less. If the specific treatment is plasma treatment, it can be applied to roll-to-roll production since sufficient effectiveness can be achieved by short-time treatment. The plasma treatment is more preferably performed under the conditions described above for 40 seconds or less, particularly preferably 30 seconds or less.

The total dose of energy during the plasma treatment is preferably 25 to 500,000 J/cm$^2$, more preferably 2,500 to 100,000 J/cm$^2$.

To generate stable plasma, the plasma treatment applied to the first embodiment may involve treating the material to be treated with reduced-pressure plasma in a large vacuum chamber. Recently, atmospheric-pressure plasma treatment apparatuses capable of treatment under an atmospheric-pressure atmosphere have been developed. These apparatuses can stably generate high-density plasma from a gas introduced into a process chamber under an atmospheric-pressure atmosphere. Such atmospheric-pressure plasma treatment apparatuses may have the following system configuration: a gas mixing/control unit, a reactor, and a transport conveyor. Apparatuses for treatment by spot ejection of a plasma jet from a cylindrical nozzle are also proposed.

As the plasma treatment conditions, the argon flow rate is preferably 5 to 500 cm$^3$ (STP)/min, more preferably 50 to 200 cm$^3$ (STP)/min, particularly preferably 80 to 120 cm$^3$ (STP)/min. In the method for producing a gas separation membrane according to the first embodiment, the oxygen flow rate is 10 cm$^3$ (STP)/min or more, preferably 10 to 100 cm$^3$ (STP)/min, more preferably 15 to 100 cm$^3$ (STP)/min, particularly preferably 20 to 50 cm$^3$ (STP)/min. The oxygen flow rate may be less than 45 cm$^3$ (STP)/min if the total pressure and the $CO_2$ partial pressure of the gas fed to the gas separation membrane are not so high, for example, if the total pressure is about 5 MPa and the $CO_2$ partial pressure is about 0.65 MPa.

As the plasma treatment conditions, the degree of vacuum is preferably 0.6 to 100 Pa, more preferably 1 to 60 Pa, particularly preferably 2 to 40 Pa.

As the plasma treatment conditions in the method for producing a gas separation membrane according to the first embodiment, the input power (discharge power) is, for example, 23 W or more, preferably 23 to 1,000 W, more preferably 40 to 1,000 W, particularly preferably 110 to 500 W.

The method for producing a gas separation membrane according to the second embodiment preferably includes a step of performing surface oxidation treatment on the resin layer precursor containing a siloxane bond (preferably, on one surface thereof). More preferably, the specific treatment is performed until the difference between the content of the repeating unit represented by general formula (3) in a surface layer of GLe extending to a depth of 20 nm and the content of the repeating unit represented by general formula (3) in a surface layer of GLi extending to a depth of 20 nm is 30% to 90%.

The method for producing a gas separation membrane according to the second embodiment preferably includes a step of performing surface oxidation treatment on the resin layer precursor containing a siloxane bond.

The surface oxidation treatment step preferably involves plasma treatment with a carrier gas at an oxygen flow rate of 10 cm$^3$ (STP)/min or more and an input power of 23 W or more.

For example, the plasma treatment may be performed for 5 to 30 seconds under the following conditions:

Plasma treatment conditions: an oxygen flow rate of 10 cm$^3$ (STP)/min or more, an argon flow rate of 100 cm$^3$ (STP)/min, and an input power (discharge power) of 23 W or more.

To improve the gas separation selectivity and to improve the scratch resistance so that the gas separation selectivity is less likely to decrease, the plasma treatment is more preferably performed under the conditions described above for 5 seconds or more, particularly preferably 10 seconds or more, more particularly preferably 20 seconds or more.

On the other hand, the plasma treatment is preferably performed under the conditions described above for 1,000 seconds or less. If the specific treatment is plasma treatment, it can be applied to roll-to-roll production since sufficient effectiveness can be achieved by short-time treatment. The plasma treatment is more preferably performed under the conditions described above for 40 seconds or less, particularly preferably 30 seconds or less.

The total dose of energy during the plasma treatment is preferably 25 to 500,000 J/cm$^2$, more preferably 2,500 to 100,000 J/cm$^2$.

To generate stable plasma, the plasma treatment applied to the second embodiment may involve treating the material to be treated with reduced-pressure plasma in a large vacuum chamber. Recently, atmospheric-pressure plasma treatment apparatuses capable of treatment under an atmospheric-pressure atmosphere have been developed. These apparatuses can stably generate high-density plasma from a gas introduced into a process chamber under an atmospheric-pressure atmosphere. Such atmospheric-pressure plasma treatment apparatuses may have the following system configuration: a gas mixing/control unit, a reactor, and a transport conveyor. Apparatuses for treatment by spot ejection of a plasma jet from a cylindrical nozzle are also proposed.

As the plasma treatment conditions, the argon flow rate is preferably 5 to 500 cm$^3$ (STP)/min, more preferably 50 to 200 cm$^3$ (STP)/min, particularly preferably 80 to 120 cm$^3$ (STP)/min. In the method for producing a gas separation membrane according to the second embodiment, the oxygen flow rate is 10 cm$^3$ (STP)/min or more, preferably 10 to 100 cm$^3$ (STP)/min, more preferably 15 to 100 cm$^3$ (STP)/min, particularly preferably 20 to 50 cm$^3$ (STP)/min.

As the plasma treatment conditions, the degree of vacuum is preferably 0.6 to 100 Pa, more preferably 1 to 60 Pa, particularly preferably 2 to 40 Pa.

As the plasma treatment conditions in the method for producing a gas separation membrane according to the second embodiment, the input power (discharge power) is 23 W or more, preferably 23 to 1,000 W, more preferably 40 to 1,000 W, particularly preferably 110 to 500 W.

The method for producing a gas separation membrane according to the third embodiment preferably includes a step of performing surface oxidation treatment on the resin layer precursor containing a siloxane bond (preferably, on one surface thereof). More preferably, the specific treatment is performed until the minimum percentage $Si_O$ of $Si^{2+}$ and $Si^{3+}$ peaks relative to all Si peaks in ESCA depth profiling of the specific resin layer and preferably additionally $\Delta 1$ and $\Delta 2$ fall within their respective ranges described above.

The specific treatment may be performed by any method. For example, plasma treatment may be performed on one surface of the resin layer precursor containing a siloxane bond.

The method for producing a gas separation membrane according to the third embodiment preferably includes a step of performing surface oxidation treatment on the resin layer precursor containing a siloxane bond.

The surface oxidation treatment step preferably involves plasma treatment with a carrier gas at an oxygen flow rate of 10 cm$^3$ (STP)/min or more and an input power of 23 W or more.

For example, the plasma treatment may be performed for 5 to 30 seconds under the following conditions:

Plasma treatment conditions: an oxygen flow rate of 10 cm$^3$ (STP)/min or more, an argon flow rate of 100 cm$^3$ (STP)/min, and an input power (discharge power) of 23 W or more.

To improve the gas separation selectivity and to improve the scratch resistance so that the gas separation selectivity is less likely to decrease, the plasma treatment is more preferably performed under the conditions described above for 5 seconds or more, particularly preferably 10 seconds or more, more particularly preferably 20 seconds or more.

On the other hand, the plasma treatment is preferably performed under the conditions described above for 1,000 seconds or less. If the specific treatment is plasma treatment, it can be applied to roll-to-roll production since sufficient effectiveness can be achieved by short-time treatment. The plasma treatment is more preferably performed under the conditions described above for 40 seconds or less, particularly preferably 30 seconds or less.

The total dose of energy during the plasma treatment is preferably 25 to 500,000 $J/cm^2$, more preferably 2,500 to 100,000 $J/cm^2$.

To generate stable plasma, the plasma treatment applied to the third embodiment may involve treating the material to be treated with reduced-pressure plasma in a large vacuum chamber. Recently, atmospheric-pressure plasma treatment apparatuses capable of treatment under an atmospheric-pressure atmosphere have been developed. These apparatuses can stably generate high-density plasma from a gas introduced into a process chamber under an atmospheric-pressure atmosphere. Such atmospheric-pressure plasma treatment apparatuses may have the following system configuration: a gas mixing/control unit, a reactor, and a transport conveyor. Apparatuses for treatment by spot ejection of a plasma jet from a cylindrical nozzle are also proposed.

As the plasma treatment conditions, the argon flow rate is preferably 5 to 500 $cm^3$ (STP)/min, more preferably 50 to 200 $cm^3$ (STP)/min, particularly preferably 80 to 120 $cm^3$ (STP)/min. In the method for producing a gas separation membrane according to the third embodiment, the oxygen flow rate is 10 $cm^3$ (STP)/min or more, preferably 10 to 100 $cm^3$ (STP)/min, more preferably 15 to 100 $cm^3$ (STP)/min, particularly preferably 20 to 50 $cm^3$ (STP)/min.

As the plasma treatment conditions, the degree of vacuum is preferably 0.6 to 100 Pa, more preferably 1 to 60 Pa, particularly preferably 2 to 40 Pa.

As the plasma treatment conditions in the method for producing a gas separation membrane according to the third embodiment, the input power (discharge power) is 23 W or more, preferably 23 to 1,000 W, more preferably 40 to 1,000 W, particularly preferably 110 to 500 W.

The plasma treatment may be replaced by other treatment such as corona treatment.

The method for producing a gas separation membrane according to the fourth embodiment preferably includes a step of performing surface oxidation treatment on the resin layer precursor containing a siloxane bond (preferably, on one surface thereof). More preferably, the specific treatment is performed until the positron lifetime τ3 of a third component formed by implantation of a positron with an energy of 1 keV into the surface of the specific resin layer is 3.40 to 4.20 ns.

The method for producing a gas separation membrane according to the fourth embodiment preferably includes a step of performing surface oxidation treatment on the resin layer precursor containing a siloxane bond.

The surface oxidation treatment step preferably involves plasma treatment with a carrier gas at an oxygen flow rate of 45 $cm^3$ (STP)/min or more and an input power of 23 W or more by anode coupling.

For example, the plasma treatment may be performed for 5 to 30 seconds under the following conditions:

Plasma treatment conditions: an oxygen flow rate of 45 $cm^3$ (STP)/min or more, an argon flow rate of 100 $cm^3$ (STP)/min, an input power (discharge power) of 23 W or more, and anode coupling.

To improve the gas separation selectivity and to improve the scratch resistance so that the gas separation selectivity is less likely to decrease, the plasma treatment in the fourth embodiment is more preferably performed under the conditions described above for 5 seconds or more, particularly preferably 10 seconds or more, more particularly preferably 20 seconds or more.

On the other hand, the plasma treatment is preferably performed under the conditions described above for 1,000 seconds or less. If the specific treatment is plasma treatment, it can be applied to roll-to-roll production since sufficient effectiveness can be achieved by short-time treatment. The plasma treatment is more preferably performed under the conditions described above for 40 seconds or less, particularly preferably 30 seconds or less.

The total dose of energy during the plasma treatment is preferably 25 to 500,000 $J/cm^2$, more preferably 2,500 to 100,000 $J/cm^2$.

As the plasma treatment conditions applied to the fourth embodiment, the argon flow rate is preferably 5 to 500 $cm^3$ (STP)/min, more preferably 50 to 200 $cm^3$ (STP)/min, particularly preferably 80 to 120 $cm^3$ (STP)/min. In the method for producing a gas separation membrane according to the fourth embodiment, the oxygen flow rate is 45 $cm^3$ (STP)/min or more, preferably 50 $cm^3$ (STP)/min or more, more preferably 50 to 100 $cm^3$ (STP)/min.

As the plasma treatment conditions, the degree of vacuum is preferably 0.6 to 100 Pa, more preferably 1 to 60 Pa, particularly preferably 2 to 40 Pa.

As the plasma treatment conditions in the method for producing a gas separation membrane according to the fourth embodiment, the input power (discharge power) is 23 W or more, preferably 23 to 1,000 W, more preferably 40 to 1,000 W, particularly preferably 110 to 500 W.

As the plasma treatment conditions in the method for producing a gas separation membrane according to the fourth embodiment, anode coupling is preferably used from the viewpoint of gas separation selectivity.

The plasma treatment used as the surface oxidation treatment in the method for producing a protective-layer-covered gas separation membrane may be replaced by corona treatment.

The surface oxidation treatment used in the method for producing a protective-layer-covered gas separation membrane may be ultraviolet ozone treatment. The ultraviolet ozone treatment may be performed by irradiating the resin layer precursor containing a siloxane bond with light containing ultraviolet light with wavelengths of 185 and 254 nm such that the total dose of light with a wavelength of 185 nm and the total dose of light with a wavelength of 254 nm fall within specific ranges.

With this configuration, the ultraviolet ozone treatment splits oxygen molecules into oxygen atoms with ultraviolet light with a wavelength of about 185 nm emitted from a UV lamp. The resulting oxygen atoms combine with oxygen molecules ($O_2$) in air to form ozone ($O_3$). The resulting ozone ($O_3$) is then irradiated with ultraviolet light with a wavelength of 254 nm to split and form active oxygen ($O^-$), which is in an excited state. These reactions are simultaneously repeated to create an active-oxygen-rich state. By direct exposure to the active oxygen, the resin layer precursor containing a siloxane bond is subjected to surface oxidation treatment. A gas separation membrane that satisfies one of conditions 1, 3, and 4 (and additionally condition 2 if the porous support A is used as the support 4) can be obtained by controlling the total dose of light with a wavelength of 185 nm and the total dose of light with a wavelength of 254 nm so that they fall within the specific ranges in the ultraviolet ozone treatment.

Figure 5:
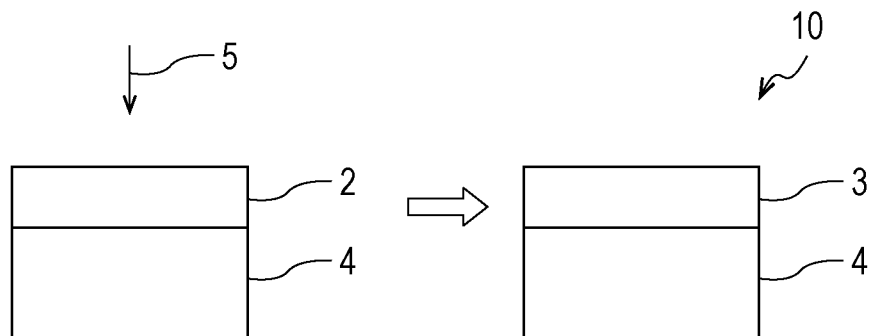
FIG. 5 is a schematic view of an exemplary method for producing a gas separation membrane used in the present invention.

The surface oxidation treatment in the method for producing a protective-layer-covered gas separation membrane will now be described with reference to the drawings. As shown in FIG. 5, the method for producing a protective-layer-covered gas separation membrane preferably includes a step of performing surface oxidation treatment 5 on one surface of a resin layer precursor 2, containing a compound having a siloxane bond, of the layered body of the support 4 and the resin layer precursor 2 containing a compound having a siloxane bond to form a gas separation membrane.

In the exemplary production method according to the present invention, while a composite fed from a composite roll is transported in the longitudinal direction, a surface oxidation treatment device performs surface oxidation treatment on the resin layer precursor 2 containing a compound having a siloxane bond to form the resin layer 3 containing a compound having a siloxane bond. As a result, the gas separation membrane 10 that satisfies one of conditions 1, 3, and 4 (and additionally condition 2 if the porous support A is used as the support 4) is obtained.

The method for producing a gas separation membrane may include a step of forming an additional resin layer on the surface of the resin layer precursor containing a siloxane bond subjected to the surface oxidation treatment 5 (not shown).

Method for Making Additional Resin Layer

An additional resin layer other than the resin layer may be made by any method. It is possible to commercially obtain a known material, to form the additional resin layer by a known method, or to form the additional resin layer from a specific resin by the method described below.

The additional resin layer other than the resin layer may be formed by any method. It is preferred to apply a composition containing a material for the additional resin layer other than the resin layer and an organic solvent to the underlayer (e.g., the specific resin layer). The composition may be applied by any known method. For example, spin coating may be used.

Although the additional resin layer other than the resin layer may be formed under any conditions, the temperature is preferably –30° C. to 100° C., more preferably –10° C. to 80° C., particularly preferably 5° C. to 50° C.

Although a gas such as air or oxygen may coexist during the formation of the additional resin layer other than the resin layer in the present invention, an inert gas atmosphere is desirable.

Provision of Porous Layer and Protective Layer

The protective layer may be provided on the resin layer by any method. In the method for producing a protective-layer-covered gas separation membrane, the protective layer is preferably provided by coating or vapor deposition. From the viewpoint of production cost, it is more preferred to apply a composition containing a material for the protective layer and an organic solvent. Examples of organic solvents include those for use in the formation of the resin layer. The composition may be applied by any known method. For example, spin coating may be used.

The porous layer may also be provided on the protective layer by any method.

The protective-layer-covered gas separation membrane may be produced by laminating a layered body of the porous layer and the protective layer to the specific resin layer of the gas separation membrane or by stacking the protective layer and the porous layer one by one on the specific resin layer. For ease of control of the degree of infiltration of the protective layer into the porous layer, the protective-layer-covered gas separation membrane is preferably produced by laminating a layered body of the porous layer and the protective layer to the specific resin layer of the gas separation membrane. A preferred embodiment for producing the protective-layer-covered gas separation membrane by laminating a layered body of the porous layer and the protective layer to the specific resin layer of the gas separation membrane will hereinafter be described.

Step of Forming Layered Body of Porous Layer and Protective Layer

The method for producing a protective-layer-covered gas separation membrane preferably includes a step of forming a layered body of the porous layer and the protective layer. More preferably, the method for producing a protective-layer-covered gas separation membrane includes the step of forming a layered body of the porous layer and the protective layer prior to a step of laminating the layered body of the porous layer and the protective layer to the specific resin layer of the gas separation membrane.

Although the protective layer may be formed on the porous layer by any method, it is preferred to apply a composition containing a material for the protective layer and an organic solvent onto the porous layer.

If the protective layer is formed on the porous layer, it is preferred to control the degree of infiltration of the protective layer into the porous layer. The degree of infiltration of the protective layer into the porous layer can be controlled, for example, by controlling the degree of dilution of organic solvent in preparing a composition for forming the protective layer and controlling the rotational speed and the amount of dripping for spin coating in applying the composition for forming the protective layer. As such a method of controlling the degree of infiltration of the protective layer into the porous layer, the method for controlling GLe and GLi in the method for forming the resin layer precursor containing a siloxane bond on the support in producing the gas separation membrane according to the second embodiment can be used as a reference with appropriate modifications.

A curable composition may be used as the material for the protective layer. Although the curable composition may be irradiated with radiation by any method to form the protective layer, electron beam, ultraviolet (UV), visible, or infrared irradiation may be used and may be selected as appropriate depending on the material used.

The radiation irradiation time is preferably 1 to 30 seconds.

The radiation energy is preferably 10 to 2,000 $mW/cm^2$.

In the production method according to the present invention, the thickness of the protective layer 8 formed by drying the coating composition may be set to a level that provides the target performance as appropriate, for example, depending on the composition of the protective layer 8.

In the production method according to the present invention, a plurality of protective layers 8 having the same composition or different compositions may be formed.

Step of Laminating Layered Body of Porous Layer and Protective Layer

Figure 10:
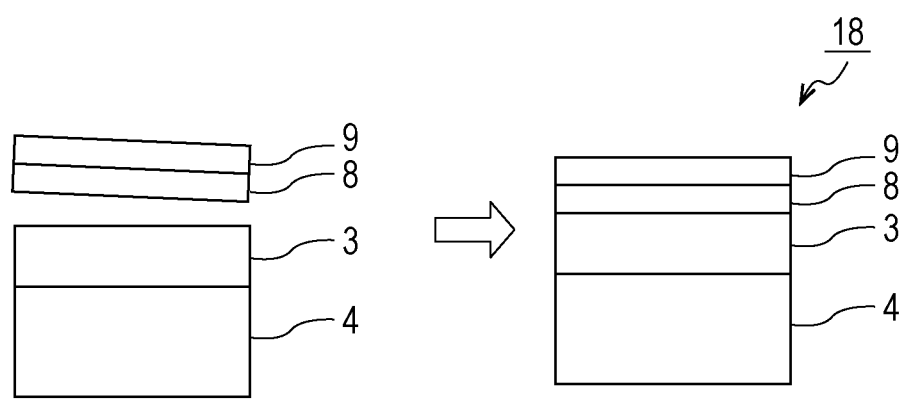
FIG. 10 is a schematic view of an exemplary method for producing a protective-layer-covered gas separation membrane according to the present invention.

The method for producing a protective-layer-covered gas separation membrane according to the present invention preferably includes a step of laminating a layered body of the porous layer and the protective layer to the specific resin layer of the gas separation membrane. A preferred embodiment of the method for producing a protective-layer-covered gas separation membrane according to the present invention will be described with reference to the drawings. FIG. 10 is a schematic view of an exemplary method for producing a protective-layer-covered gas separation membrane according to the present invention. In FIG. 10, a layered body of the porous layer 9 and the protective layer 8 is laminated to the resin layer 3 containing a compound having a siloxane bond of the gas separation membrane, the resin layer 3 being formed on the support 4. Specifically, a surface of the layered body of the porous layer 9 and the protective layer 8 on the protective layer 8 side is brought into contact with the surface of the resin layer 3 containing a compound having a siloxane bond of the gas separation membrane to thereby produce the protective-layer-covered gas separation membrane 18 according to the present invention. To provide good initial gas permeation performance and good abrasion resistance, it is more preferable to perform the lamination with the resin layer 3 containing a compound having a siloxane bond of the gas separation membrane and the protective layer 8 being directly adjacent to each other by bringing the surface of the layered body of the porous layer 9 and the protective layer 8 on the protective layer 8 side into contact with the oxidation-treated surface of the resin layer 3 containing a compound having a siloxane bond of the gas separation membrane. The oxidation-treated surface of the resin layer 3 containing a compound having a siloxane bond of the gas separation membrane preferably has adhesive properties. The layered body of the porous layer and the protective layer may be laminated to the specific resin layer of the gas separation membrane with an adhesive, such as a pressure-sensitive adhesive, interposed therebetween.

Gas Separation Membrane Module and Gas Separation Apparatus

A gas separation membrane module according to the present invention has the protective-layer-covered gas separation membrane according to the present invention. The gas separation membrane module is preferably produced by cutting from a roll and performing processing.

The protective-layer-covered gas separation membrane according to the present invention is preferably combined with a porous support to form a thin film composite, and the thin film composite is preferably used to form a gas separation membrane module. The protective-layer-covered gas separation membrane, the thin film composite, or the gas separation membrane module according to the present invention can be used to form a gas separation apparatus having means for separating and recovering or separating and purifying a gas. The protective-layer-covered gas separation membrane according to the present invention is suitable for use as a module. Examples of modules include spiral modules, hollow-fiber modules, pleated modules, tubular modules, and plate-and-frame modules. The protective-layer-covered gas separation membrane according to the present invention may also be applied to, for example, a gas separation and recovery apparatus based on a membrane-absorption hybrid method in combination with a liquid absorbent, as disclosed in JP2007-297605A.

EXAMPLES

The present invention will now be more specifically described with reference to the following examples and comparative examples (the comparative examples do not necessarily belong to the known art). The materials, amounts, proportions, processes, process sequences, and other details given in the following examples may be changed as appropriate without departing from the spirit of the present invention. Thus, the specific examples given below should not be construed as limiting the scope of the present invention.

In the following, parts and percentages are by mass unless otherwise specified.

Example 1

<Preparation of Polymerizable, Radiation-Curable Composition for Forming Resin Layer Precursor Containing Siloxane Bond>
(Preparation of Radiation-Curable Polymer Solution Containing Poly(dialkylsiloxane))

In a 150 mL three-necked flask, 39 g of UV9300 (available from Momentive Performance Materials Inc.), 10 g of X-22-162C (available from Shin-Etsu Chemical Co., Ltd.), and 0.007 g of DBU (1,8-diazabicyclo[5.4.0]undec-7-ene) were placed and dissolved in 50 g of n-heptane. The resultant was held at 95° C. for 168 hours to obtain a radiation-curable polymer solution containing poly(dialkylsiloxane) (viscosity at 25° C.: 22.8 mPa·s).

UV9300 (CAS (Chemical Abstracts Service) Registry Number: 67762-95-2)

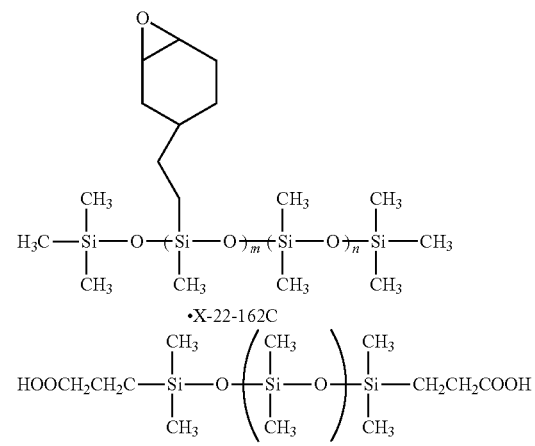

(Preparation of Polymerizable, Radiation-Curable Composition)

The radiation-curable polymer solution cooled to 20° C. was diluted with n-heptane to a solids content of 10% by mass. To the resulting solution, 0.5 g of 10591 (available from Tokyo Chemical Industry Co., Ltd.) and 0.1 g of titanium isopropoxide (available from Aldrich), serving as photopolymerization initiators, were added to prepare a polymerizable, radiation-curable composition.

<Formation of Resin Layer Precursor Containing Siloxane Bond>

Using a polyacrylonitrile (PAN) porous membrane (the polyacrylonitrile porous membrane was disposed on a non-woven fabric; thickness (including the non-woven fabric), 200 μm) as a porous support A, the polymerizable, radiation-curable composition was applied by spin coating under the following conditions: 1,000 rpm; the amount of dripping, 0.025 mL/cm². The resultant was then stored at room temperature for 10 minutes. Thereafter, the polymerizable, radiation-curable composition was subjected to UV treatment (Light Hammer 10 manufactured by Fusion UV System, D-valve) under the following UV treatment conditions: UV intensity, 24 kW/m²; UV irradiation time, 10 seconds; to cure the resin layer precursor containing a siloxane bond. In this manner, a precursor having the PAN porous membrane (porous support A) and a resin layer disposed on the porous support A was formed.

In this manner, the resin layer precursor containing a siloxane bond and including a region GLi (thickness, as measured by the method described later: 280 nm, 58% of the thickness of GLe) where the compound having a siloxane bond was present in the porous support A and a region GLe (thickness: 480 nm) where the resin layer was present on the porous support A was formed.

(Calculation of Thickness of GLe and GLi)

The measurement was made using ULVAC-PHI TRIFT V nano TOF time-of-flight secondary ion mass spectrometry (TOF-SIMS) equipped with an Ar-GCIB gun. Bi3++ (30 kV) was used as a primary ion source. A 20 eV electron gun was used in combination for charge neutralization. For in-depth profiling, Ar-GCIB (Ar2500+, 15 kV) was used. The maximum intensity of peaks attributed to silicone was determined to determine the thickness of GLe and GLi.

The content of the repeating unit represented by general formula (3) in a surface layer of each of the thus-defined regions GLe and GLi extending (from the surface) to a depth of 20 nm was determined. A Si 2p spectrum was obtained by ESCA depth profiling. The valences of silicon atoms ($Si^{2+}$, $Si^{3+}$, and $Si^{4+}$) were separated and quantified by curve fitting of Si 2p spectrum peaks. The depth profiles of $Si^{4+}$, $Si^{3+}$, and $Si^{2+}$ were measured, and the percentage of $Si^{4+}$ relative to all Si components (the sum of $Si^{4+}$, $Si^{3+}$, and $Si^{2+}$) was calculated as the integral over the surface layer extending to a depth of 20 nm. The content of the repeating unit represented by general formula (3) in the surface layer of GLe extending to a depth of 20 nm and the content of the repeating unit represented by general formula (3) in the surface layer of GLi extending to a depth of 20 nm were determined as the average of five (N) measurements taken at different sites. The difference between the content of the repeating unit represented by general formula (3) in the surface layer of GLe extending to a depth of 20 nm and the content of the repeating unit represented by general formula (3) in the surface layer of GLi extending to a depth of 20 nm was calculated to be 83%.

It was also determined that the surface layer of GLe extending to a depth of 20 nm and the surface of GLe in the specific resin layer contained a compound having a siloxane bond and having the repeating unit represented by general formula (1), the repeating unit represented by general formula (2), and the repeating unit represented by general formula (3).

The depth from the surface of the specific resin layer containing a compound having a siloxane bond in the direction toward the support was calculated from the etching rate of the material forming the specific resin layer, namely, 10 nm/min. This value can be determined for each material; thus, the value best suited for the material is used as appropriate.

Similarly, the surface of the resin layer (the surface of GLe) can be identified by measuring the O/Si ratio using ESCA. Specifically, the surface of GLe is identified as a plane in which the O/Si ratio is maximized as measured from the surface of the gas separation membrane facing away from the porous support A in the direction toward the porous support A and in which silicon atoms are contained in an amount of 3% (atomic %) or more. The measurement of GLe and GLi was performed after the surface oxidation treatment described later.

<Surface Oxidation Treatment (Plasma Treatment) of Resin Layer Precursor Containing Siloxane Bond>

The porous support on which the resin layer precursor containing a siloxane bond was formed was placed in a desktop vacuum plasma device (available from YOUTEC Co., Ltd.), and plasma treatment was performed under the following conditions: carrier gas: oxygen flow rate, 20 $cm^3$ (STP)/min, argon flow rate, 100 $cm^3$ (STP)/min; the degree of vacuum, 30 Pa; input power, 150 W; treating time, 10 seconds.

<Protective Layer Coating Solution>

After 962 g of VQM-146 (available from Gelest, trade name, the following structure) and 38 g (insufficient amount) of HMS-301 (available from Gelest, trade name, the following structure) were dissolved in 9,000 g of heptane, 1.2 g of SIP6832.2 (available from Gelest, trade name, the following structure) was added, and the solution was reacted at 80° C. for 10 hours. To the solution, 0.4 g of 2-methyl-3-butyn-2-ol (available from Aldrich) was added to obtain a solution of a precrosslinked vinyl compound (a solution of a crosslinkable polysiloxane compound (a)) of the following structure.

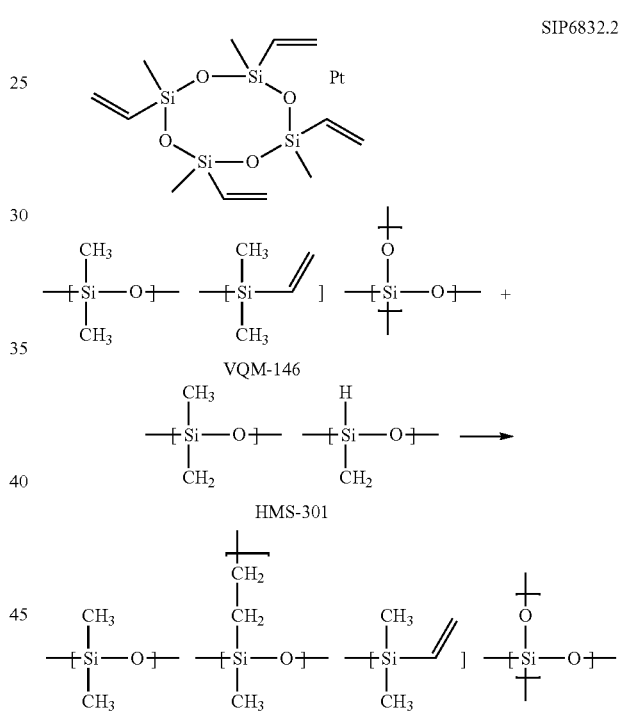

After 150 g (excessive amount) of HMS-301 (available from Gelest, trade name) and 850 g of VQM-146 (available from Gelest, trade name) were dissolved in 9,000 g of heptane, 1.2 g of SIP6832.2 (available from Gelest, trade name) was added, and the solution was reacted at 80° C. for 10 hours. To the solution, 0.4 g of 2-methyl-3-butyn-2-ol (available from Aldrich) was added to obtain a solution of a precrosslinked hydro compound (a solution of a crosslinkable polysiloxane compound (b)) of the following structure.

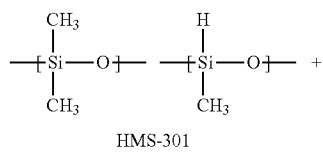

-continued

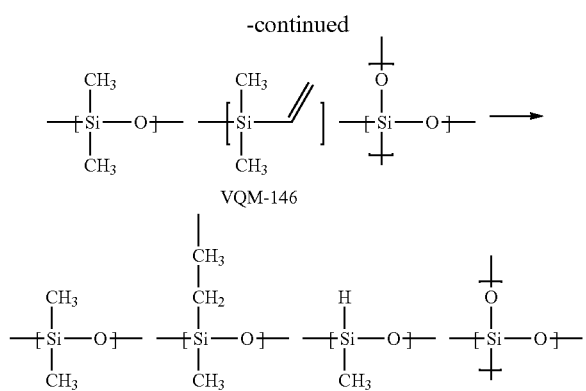

VQM-146

The resulting solutions of the precrosslinked vinyl and hydro compounds were mixed in a mass ratio of 10:1 to obtain a protective layer coating solution.

This protective layer coating solution can be used for film formation to form a protective layer containing a Q-resin-containing PDMS by the following reaction scheme for the formation of the protective layer. The right side of the following reaction scheme for the formation of the protective layer schematically shows the structural units after crosslinking through the reaction between the solutions of the precrosslinked vinyl and hydro compounds. Specifically, of the structural units after the curing reaction in the reaction scheme for the following formation of the protective layer, the structural units having an ethylene group include the structural units having an ethylene group that are contained in the solutions of the precrosslinked vinyl and hydro compounds before the curing reaction and structural units newly formed by the reaction of the structural units having a vinyl group and the structural units having a hydrosilyl group that are contained in the solutions of the precrosslinked vinyl and hydro compounds before the curing reaction.

Reaction Scheme for Formation of Protective Layer

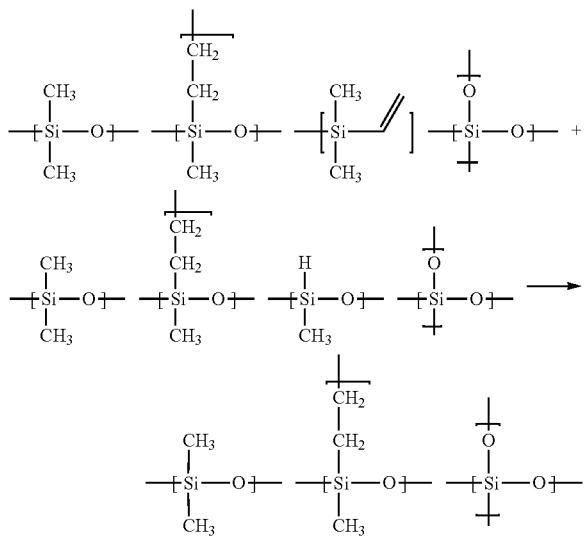

<Formation of Protective Layer and Porous Layer>

The above polymerizable, radiation-curable composition for forming a resin layer precursor containing a siloxane bond was used as a polymerizable, radiation-curable composition for forming a protective layer.

To a polyacrylonitrile (PAN) porous membrane (the polyacrylonitrile porous membrane was disposed on a non-woven fabric; thickness (including the non-woven fabric), 200 µm), the polymerizable, radiation-curable composition for forming a protective layer was applied by spin coating under the following conditions: 3,000 rpm; the amount of dripping, 0.025 mL/cm$^2$. The resultant was then stored at room temperature for 1 minute. Thereafter, the polymerizable, radiation-curable composition was subjected to UV treatment (Light Hammer 10 manufactured by Fusion UV System, D-valve) under the following UV treatment conditions: UV intensity, 24 kW/m$^2$; UV irradiation time, 10 seconds; to cure the polymerizable, radiation-curable composition for forming a protective layer. A region of the PAN porous membrane that was substantially unfilled with the compound having a siloxane bond formed a porous layer, and the other region formed a region PLi where the protective layer was present in the porous layer.

In this manner, a layered body of the protective layer and the porous layer was formed. The protective layer includes the region PLi (thickness: 60 nm) where the protective layer is present in the porous layer and a region PLe (thickness: 90 nm) where the protective layer is present on the porous layer.

In the table below, the radiation-curable polymer containing poly(dialkylsiloxane) used for the polymerizable, radiation-curable composition for forming a protective layer is abbreviated as PDMS-containing.

Although the material for the protective layer is the same as the material for the resin layer precursor containing a siloxane bond, the composition of the protective layer not subjected to surface oxidation treatment is different from the composition of the specific resin layer that has been subjected to surface oxidation treatment.

(Calculation of PLe and PLi)

The thickness of the protective layer was measured as described below.

The measurement was made using ULVAC-PHI TRIFT V nano TOF time-of-flight secondary ion mass spectrometry (TOF-SIMS) equipped with an Ar-GCIB gun. Bi3++ (30 kV) was used as a primary ion source. A 20 eV electron gun was used in combination for charge neutralization. For in-depth profiling, Ar-GCIB (Ar2500+, 15 kV) was used. The maximum intensity of peaks attributed to silicone was determined to measure the thickness of PLe and PLi, and the degree of infiltration of the protective layer into the porous layer, expressed by the following formula, was determined. The results obtained are shown in the table below.

Degree of infiltration of protective layer into porous layer=100%×(thickness of PLi)/(thickness of PLi+thickness of PLe)

The surface (the interface with the protective layer) of the resin layer can be analyzed by cross-sectional SEM.

<Lamination of Protective Layer>

The layered body including the protective layer and the porous layer was laminated to the plasma-treated surface of the specific resin layer of the gas separation membrane. Specifically, the layered body and the plasma-treated surface were brought into contact with each other such that the specific resin layer of the gas separation membrane and the protective layer of the layered body were adjacent to each other, and laminated to each other using a rubber roller. Thus, a protective-layer-covered gas separation membrane of Example 1 was obtained.

(Calculation of Numbers of Silicon Atoms, Oxygen Atoms, and Carbon Atoms in Resin Layer Containing Compound Having Siloxane Bond)

The center of the porous support having the specific resin layer subjected to surface oxidation treatment formed thereon was sampled. ESCA was used to calculate the O/Si ratio (A) that is the ratio of the number of oxygen atoms to the number of silicon atoms contained in the specific resin layer at a depth of 10 nm from the surface of the specific resin layer and the O/Si ratio (B) that is the ratio of the number of oxygen atoms to the number of silicon atoms in the surface of the specific resin layer.

The porous support having the specific resin layer formed thereon was placed in a Quantera SXM available from Physical Electronics, Inc. The O/Si ratio (B) that is the ratio of the number of oxygen atoms to the number of silicon atoms in the surface of the specific resin layer was calculated to be 1.85 under the following conditions: X-ray source, Al-Kα radiation (1,490 eV, 25 W, 100 μm in diameter); measurement region, 300 μm×300 μm; pass energy, 55 eV; step, 0.05 eV. The carbon/silicon ratio that is the ratio of the number of carbon atoms to the number of silicon atoms in the surface of the specific resin layer was also calculated in the same manner.

Subsequently, to determine the O/Si ratio (A) that is the ratio of the number of oxygen atoms to the number of silicon atoms contained in the specific resin layer at a depth of 10 nm from the surface of the resin layer, etching was performed with $C_{60}$ ions. Specifically, a 2 mm×2 mm region was etched to a depth of 10 nm with a $C_{60}^+$ ion beam with an energy of 10 keV at 10 nA from a $C_{60}$ ion gun associated with a Quantera SXM available from Physical Electronics, Inc. Using the ESCA apparatus on this film, the O/Si ratio (A) that is the ratio of the number of oxygen atoms to the number of silicon atoms in the surface of the specific resin layer was calculated to be 1.19. The depth from the surface of the specific resin layer was calculated from the etching rate of the material forming the specific resin layer, namely, 10 nm/min. This value can be determined for each material; thus, the value best suited for the material is used as appropriate.

From the calculated O/Si ratio (A) that is the ratio of the number of oxygen atoms to the number of silicon atoms in the specific resin layer at a depth of 10 nm from the surface of the specific resin layer and the calculated O/Si ratio (B) that is the ratio of the number of oxygen atoms to the number of silicon atoms in the surface of the specific resin layer, the value of A/B was calculated to be 0.64.

The O/Si ratio (C) that is the ratio of the number of oxygen atoms to the number of silicon atoms in the specific resin layer at a depth of 30 nm from the surface of the specific resin layer was determined in the same manner as the O/Si ratio (A) that is the ratio of the number of oxygen atoms to the number of silicon atoms in the specific resin layer at a depth of 10 nm from the surface of the specific resin layer. From the O/Si ratio (B) and the O/Si ratio (C), the value of C/B was calculated to be 0.54. The value of the carbon/silicon ratio that is the ratio of the number of carbon atoms to the number of silicon atoms in the surface of the specific resin layer was also calculated in the same manner.

The surface of the resin layer is a plane in which the O/Si ratio is maximized as measured from the surface of the gas separation membrane and in which silicon atoms are contained in an amount of 3% (atomic %) or more. The plane in which the O/Si ratio is maximized as measured from the surface of the gas separation membrane and in which silicon atoms are contained in an amount of 3% (atomic %) or more was identified in the same manner as in the determination of the O/Si ratio (A) that is the ratio of the number of oxygen atoms to the number of silicon atoms in the specific resin layer at a depth of 10 nm from the surface of the resin layer.

As a result, by the method described above, the surface of the specific resin layer as-formed on the porous support (without other layers (e.g., a protective layer)) was determined to be the "plane in which the O/Si ratio is maximized as measured from the surface of the gas separation membrane and in which silicon atoms are contained in an amount of 3% (atomic %) or more".

It was determined by the following method that the surface of the specific resin layer contained a compound, having a siloxane bond and having the repeating unit represented by general formula (1), the repeating unit represented by general formula (2), and the repeating unit represented by general formula (3).

The Si 2p spectrum was measured by ESCA, and the valences of Si ($Si^{2+}$, $Si^{3+}$, and $Si^{4+}$) were separated and quantified by curve fitting of the resulting peaks.

It was also determined in the same manner that the percentage of the repeating unit represented by general formula (3) to the repeating unit represented by general formula (2) and the repeating unit represented by general formula (1) in the compound, having a siloxane bond, contained in the surface of the specific resin layer was 100 to 600 mol %.

It was determined by the following method that the specific resin layer contained a compound having a siloxane bond and having the repeating unit represented by general formula (1), the repeating unit represented by general formula (2), and the repeating unit represented by general formula (3) at depths of 10 nm and 30 nm from the surface of the resin layer.

Etching was performed as in the Examples. The Si 2p spectrum was measured by ESCA, and the valences of Si ($Si^{2+}$, $Si^{3+}$, and $Si^{4+}$) were separated and quantified by curve fitting of the resulting peaks.

It was also determined in the same manner that the percentage of the repeating unit represented by general formula (3) to the repeating unit represented by general formula (2) and the repeating unit represented by general formula (1) in the compound, having a siloxane bond, contained in the specific resin layer at a depth of 10 nm from the surface of the specific resin layer was 3 to 500 mol %.

It was also determined in the same manner that the percentage of the repeating unit represented by general formula (3) to the repeating unit represented by general formula (2) and the repeating unit represented by general formula (1) in the compound, having a siloxane bond, contained in the specific resin layer at a depth of 30 nm from the surface of the resin layer was 3 to 400 mol %.

(Calculation of Percentage of $Si^{2+}$ and $Si^{3+}$ Peaks Relative to All Si Peaks in ESCA Depth Profiling)

The sum of $Si^{2+}$ and $Si^{3+}$ peaks and the percentage thereof relative to all Si peaks in the specific resin layer in the depth direction were calculated by ESCA on a resin etched with $C_{60}$ ions.

Specifically, while a 2 mm×2 mm region was etched at an etching rate of 10 nm/min with a $C_{60}^+$ ion beam with an energy of 10 keV at 10 nA from a $C_{60}$ ion gun associated with a Quantera SXM available from Physical Electronics, Inc., the Si 2p spectrum was measured in the surface of the specific resin layer using the ESCA apparatus. The valences of Si ($Si^{2+}$, $Si^{3+}$, and $Si^{4+}$) were separated and quantified by curve fitting of the resulting peaks to determine the profile of each peak intensity in the depth direction.

The percentage of $Si^{2+}$ and $Si^{3+}$ peaks relative to the sum of all Si peaks ($Si^{2+}$, $Si^{3+}$, and $Si^{4+}$) quantified at each depth was calculated to determine the profile of $Si^{2+}$ and $Si^{3+}$ in the depth direction. The minimum percentage ($Si_0$) was determined to be 11.5%. The gas separation membrane of each example had the surface of the outermost layer (facing away from the support) of the specific resin layer located at the position where the minimum percentage ($Si_0$) of $Si^{2+}$ and $Si^{3+}$ peaks relative to all Si peaks was reached.

Δ1 is defined as the difference ($Si_{10}$)–($Si_0$) between the minimum percentage ($Si_0$) of $Si^{2+}$ and $Si^{3+}$ peaks relative to all Si peaks ($Si^{2+}$+$Si^{3+}$/all Si) and the percentage ($Si_{10}$) of $Si^{2+}$ and $Si^{3+}$ peaks relative to all Si peaks ($Si^{2+}$+$Si^{3+}$/all Si) at a depth of 10 nm from the position where the minimum percentage ($Si_0$) of $Si^{2+}$ and $Si^{3+}$ peaks relative to all Si peaks ($Si^{2+}$+$Si^{3+}$/all Si) was reached.

Similarly, Δ2 is defined as the difference ($Si_{20}$)–($Si_0$) between the minimum percentage ($Si_0$) of $Si^{2+}$ and $Si^{3+}$ peaks relative to all Si peaks ($Si^{2+}$+$Si^{3+}$/all Si) and the percentage ($Si_{20}$) of $Si^{2+}$ and $Si^{3+}$ peaks relative to all Si peaks ($Si^{2+}$+$Si^{3+}$/all Si) at a depth of 20 nm from the position where the minimum percentage ($Si_0$) of $Si^{2+}$ and $Si^{3+}$ peaks relative to all Si peaks ($Si^{2+}$+$Si^{3+}$/all Si) was reached.

$Si_0$, $Si_{10}$, and $Si_{20}$ were calculated as the average of five (N) measurements taken at different sites.

(Measurement of Positron Lifetime of Third Component and Relative Intensity of Third Component)

A 1.5 cm×1.5 cm square test piece of specific resin layer was cut from each gas separation membrane and was attached to a commercially available Si wafer. After vacuum degassing at room temperature (25° C.), the positron annihilation lifetime was measured under the following conditions. Under the following conditions, the positron lifetime of the third component and the relative intensity of the third component are uniquely determined.

TABLE 2

| Measurement apparatus | PALS-200A small-sized positron beam generation apparatus (positron lifetime measurement apparatus compatible with thin film) available from Fuji Imvac Inc. |
|---|---|
| Positron source | Positron beam based on $^{22}$Na |
| Gamma-ray detector | BaF$_2$ scintillator + photomultiplier |
| Apparatus constants | Values determined depending on apparatus (in this measurement, 263 to 280 ps and 25.55 ps/ch) |
| Beam energy | 1 keV, 3 keV |
| Measurement temperature | Room temperature (25° C.) |
| Measurement atmosphere | Vacuum |
| Total count | Count of 5,000,000 |

The resulting data was analyzed for the third component based on the nonlinear least-square program POSITRON-FIT, and the positron lifetime τ3 (ns) of the third component and the relative intensity I3 of the third component were calculated for beam energies of 1 keV and 3 keV (P. Kirkegaard, M. Eldrup, O. E. Mogensen, N. J. Pedersen, Computer Physics Communications, 23, 307 (1981)). The results were as follows: τ3 (implantation at 1 keV) was 4.02 μs, I3 (implantation at 1 keV) was 35%, and τ3 (implantation at 3 keV) was 4.1 μs.

The case where the specific resin layer is not the outermost layer but another layer, such as a protective layer, is located outside the specific resin layer will be described. In this case, the conditions for exposing the surface of the specific resin layer by etching in ESCA are calculated, and a sample etched under those conditions is used for the measurement of the positron lifetime of the third component and the relative intensity of the third component.

(Calculation of Numbers of Silicon Atoms and Oxygen Atoms in Protective Layer)

The numbers of silicon atoms and oxygen atoms in the protective layer were calculated in the same manner as the numbers of silicon atoms, oxygen atoms, and carbon atoms in the specific resin layer.

The O/Si ratio (B) that is the ratio of the number of oxygen atoms to the number of silicon atoms in the inner portion of the protective layer was calculated to be 1.05.

(Identification of $Si^{4+}$ Component in Protective Layer)

As with the specific resin layer, the Si 2p spectra of the protective layers formed in Examples 1 and Example 2 to 9 described later were measured by ESCA, and the valences of Si ($Si^{2+}$, $Si^{3+}$, and $Si^{4+}$) were separated and quantified by curve fitting of the resulting peaks. It was determined that the protective layers formed in Examples 1 to 9 contained the $Si^{4+}$ component.

Examples 2 to 8

Protective-layer-covered gas separation membranes of Examples 2 to 8 were obtained in the same manner as in Example 1 except that the thicknesses of PLe and PLi were adjusted so as to achieve the degree of infiltration of the protective layer into the porous layer and the thickness of the protective layer (the total thickness of PLe of PLi) shown in the table below by appropriately adjusting the degree of dilution of n-heptane in preparing a polymerizable, radiation-curable composition for forming a protective layer, and the rotational speed and the amount of dripping for spin coating in applying the polymerizable, radiation-curable composition for forming a protective layer.

Example 9

A protective-layer-covered gas separation membrane of Example 9 was obtained in the same manner as in Example 1 except that the polyimide resin described below was used in place of the silicone resin and that the protective layer was fabricated such that the thicknesses of PLe and PLi were adjusted so as to achieve the degree of infiltration of the protective layer into the porous layer and the thickness of the protective layer (the total thickness of PLe of PLi) shown in the table below by appropriately adjusting the amount of dripping in applying a polymerizable, radiation-curable composition for forming a protective layer.

The protective-layer-covered gas separation membrane of Example 9 was fabricated in the same manner as in Example 1 except that a protective layer containing Polymer (P-101), which is a polyimide, synthesized by the following reaction scheme was formed using a polymerizable, radiation-curable composition for forming a protective layer, the composition being prepared by dissolving Polymer (P-101) in a solvent.

(Synthesis of Polymer (P-101))

Polymer (P-101) was synthesized by the following reaction scheme:

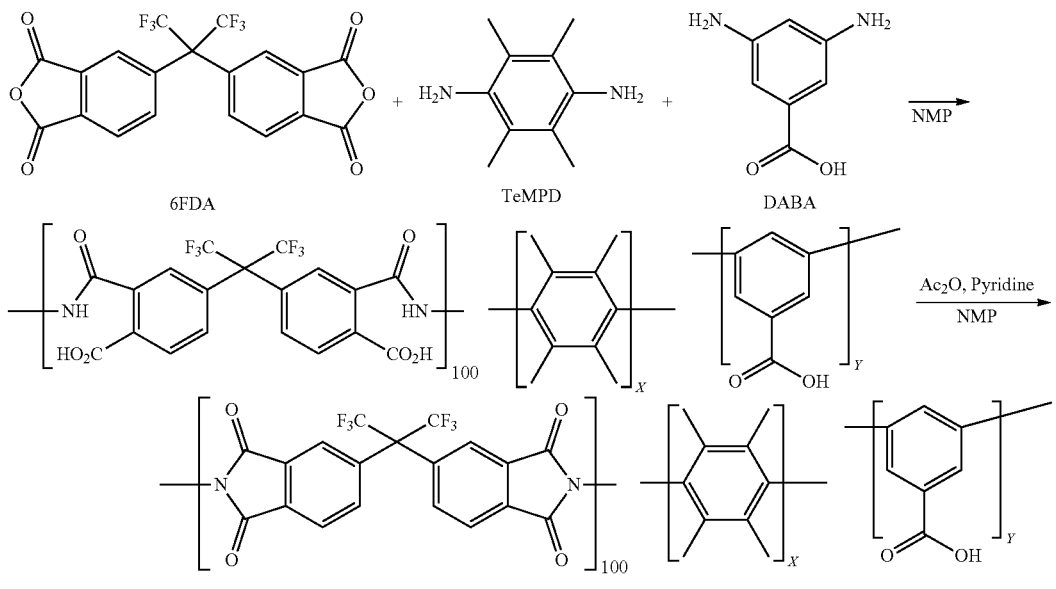

X = 20, Y = 80

Synthesis of Polymer (P-101)

In a 1 L three-necked flask were placed 123 mL of N-methylpyrrolidone and 54.97 g (0.124 mol) of 6FDA (available from Tokyo Chemical Industry Co., Ltd., product No. H0771), and the 6FDA was dissolved at 40° C. While the solution was maintained at 40° C., a solution of 4.098 g (0.0248 mol) of 2,3,5,6-tetramethylphenylenediamine (available from Tokyo Chemical Industry Co., Ltd., product No. T1457, TeMPD) and 15.138 g (0.0992 mol) of 3,5-diaminobenzoic acid (DABA) in 84.0 mL of N-methylpyrrolidone was added dropwise with stirring in a nitrogen stream over 30 minutes. After the reaction solution was stirred at 40° C. for 2.5 hours, 2.94 g (0.037 mol) of pyridine (available from Wako Pure Chemical Industries, Ltd.) and 31.58 g (0.31 mol) of acetic anhydride (available from Wako Pure Chemical Industries, Ltd.) were added, and the mixture was further stirred at 80° C. for 3 hours. Thereafter, the reaction solution was diluted with 676.6 mL of acetone. In a 5 L stainless steel vessel were placed 1.15 L of methanol and 230 mL of acetone, and the dilution of the reaction solution with acetone was added dropwise with stirring. The resulting polymer crystal was vacuum-filtered and was dried with air at 60° C. to obtain 50.5 g of Polymer (P-101). Polymer (P-101) is Exemplary Polyimide Compound P-100 listed above where X:Y=20:80. In the table below, Polymer (P-101) is abbreviated as PI.

To 4.95 kg of methyl ethyl ketone was added 50 g of Polymer (P-101), and the mixture was stirred at 25° C. for 30 minutes. Thereafter, the stirred solution was used as a polymerizable, radiation-curable composition for forming a protective layer.

Comparative Example 1

A gas separation membrane of Comparative Example 1 was fabricated by the same procedure as in Example 1 except that the formation of a protective layer and a porous layer was not performed.

Comparative Example 2

A protective-layer-covered gas separation membrane of Comparative Example 2 was obtained in the same manner as in Example 1 except that a nonporous PET (polyethylene terephthalate, available from Toyobo Co., Ltd., 100 μm in thickness) was used in place of the PAN porous membrane (denoted as porous PAN in the table) in forming a protective layer and a porous layer and that the amount of dripping in applying a polymerizable, radiation-curable composition for forming a protective layer was appropriately adjusted so as to achieve the thickness of the protective layer shown in the table below. The protective-layer-covered gas separation membrane of Comparative Example 2 had a PLi of 0 nm, a PLe of 200 nm, and a degree of infiltration of the protective layer into the porous layer of 0%.

Evaluation

Measurement of Thickness of Protective Layer

The interface between the protective layer and the separation layer of the protective-layer-covered gas separation membrane of each example was identified by cross-sectional SEM, and the thickness of the protective layer was measured. The results are shown in the table below.

Initial Gas Permeation Performance

The resulting protective-layer-covered gas separation membrane of each example and the gas separation membrane of each comparative example were evaluated using a high-pressure-resistant SUS316 (SUS: stainless used steel) stainless steel cell (available from Denissen) adjusted to a cell temperature of 30° C. A mixed gas of carbon dioxide ($CO_2$) and methane ($CH_4$) in a volume ratio of 6:94 was adjusted so that the total pressure on the gas feed side was 5 MPa ($CO_2$ partial pressure: 0.65 MPa). $CO_2$ and $CH_4$ gas permeability was measured by gas chromatography with TCD detection. The initial gas separation selectivity of the protective-layer-covered gas separation membrane of each example and the gas separation membrane of each comparative example was calculated as the ratio ($P_{CO2}/P_{CH4}$) of the $CO_2$ permeability coefficient $P_{CO2}$ to the $CH_4$ permeability coefficient $P_{CH4}$ of the membrane. The initial $CO_2$ gas permeability of the protective-layer-covered gas separation membrane of each example and the gas separation membrane of each comparative example was calculated as the $CO_2$ permeance $Q_{CO2}$ (unit: GPU) of the membrane.

Rating Scale of Gas Permeation Performance

Gas separation membranes with a gas permeability ($CO_2$ permeance $Q_{CO2}$) of 10 GPU or more and a gas separation selectivity of 30 or more were rated as A.

Gas separation membranes with a gas permeability ($CO_2$ permeance $Q_{CO2}$) of 10 GPU or more and a gas separation selectivity of less than 30 or with a gas permeability ($CO_2$ permeance $Q_{CO2}$) of less than 10 GPU and a gas separation selectivity of 30 or more were rated as B.

Gas separation membranes with a gas permeability ($CO_2$ permeance $Q_{CO2}$) of less than 10 GPU and a gas separation selectivity of less than 30 and gas separation membranes that were unable to be tested since no pressure occurred (no pressure was maintained) were rated as C.

Gas permeability is expressed in GPU (1 GPU=1×10$^{-6}$ cm$^3$ (STP)/cm$^2$·sec·cmHg), which represents the permeation flux per unit pressure difference (also known as permeance), or in barrers (1 barrer=1×10$^{-10}$ cm$^3$ (STP)·cm/cm$^2$·sec·cmHg), which represents permeability coefficient. As used herein, GPU is denoted by the symbol Q, whereas barrer is denoted by the symbol P.

The results are shown in the table below.

Abrasion Resistance

A nonwoven fabric (BEMCOT available from Asahi Kasei Corporation) was placed on the protective layer of the protective-layer-covered gas separation membrane of each example and Comparative Example 2 or on the specific resin layer of the gas separation membrane of Comparative Example 1, and the gas permeation performance was measured after the nonwoven fabric was moved by a distance of 5 cm under a load of 20 g. The measured gas permeation performance was used as the gas permeation performance after an abrasion resistance test.

The performance retention of the $CO_2$ gas permeability after an abrasion resistance test relative to the initial $CO_2$ gas permeability was calculated. Using the results, abrasion resistance was evaluated according to the following criteria. The abrasion resistance is preferably at Grade A or B, more preferably at Grade A.

A: 80% or more
B: Less than 80% and 50% or more
C: Less than 50%

The results are shown in the table below.

Bending Resistance

The protective layer of the protective-layer-covered gas separation membrane of each example and Comparative Example 2 or the gas separation membrane of Comparative Example 1 was wrapped around a cylindrical roll having a diameter of 20 mm and allowed to sit at 25° C. and a relative humidity of 20% for 24 hours. The gas permeation performance after being wrapped around a roll was evaluated in the manner described above.

The percentage (retention) of the gas permeation performance (gas permeability; $CO_2$ permeance $Q_{CO2}$) after being wrapped around a roll relative to the gas permeation performance (gas permeability; $CO_2$ permeance $Q_{CO2}$) before being wrapped around a roll was calculated. The gas permeation performance before being wrapped around a roll is equal to the initial gas permeation performance. Using the results, bending resistance was evaluated according to the following criteria. The bending resistance is preferably at Grade A or B, more preferably at Grade A.

A: The retention is 80% or more.
B: The retention is less than 80% and 30% or more.
C: The retention is less than 30%.

The results are shown in the table below.

TABLE 3

|  |  | Example 1 | Example 2 | Example 3 | Example 4 | Example 5 | Example 6 | Example 7 | Example 8 | Example 9 | Comparative example 1 | Comparative example 2 |
|---|---|---|---|---|---|---|---|---|---|---|---|---|
| Porous layer | Material | Porous PAN | Porous PAN | Porous PAN | Porous PAN | Porous PAN | Porous PAN | Porous PAN | Porous PAN | Porous PAN | Not formed | — (Nonporous PET) |
| Protective layer | Formed or not | Yes | Yes | Yes | Yes | Yes | Yes | Yes | Yes | Yes | No | Yes |
|  | Degree of infiltration (%) | 40 | 8 | 100 | 5 | 95 | 20 | 15 | 80 | 5 | — | 0 |
|  | Thickness (nm) | 150 | 3200 | 200 | 500 | 500 | 500 | 2000 | 1000 | 100 | — | 200 |
|  | Material | PDMS-containing | PDMS-containing | PDMS-containing | PDMS-containing | PDMS-containing | PDMS-containing | PDMS-containing | PDMS-containing | PI | — | PDMS-containing |
| Evaluation | Initial gas permeation performance | A | B | A | A | A | A | A | A | B | A | C |
|  | Abrasion resistance | B | B | B | B | B | A | A | A | B | C | A |
|  | Bending resistance | A | A | B | A | A | A | A | A | A | B | A |

The above table shows that the protective-layer-covered gas separation membrane according to the present invention has good initial gas permeation performance, good abrasion resistance, and good bending resistance.

By contrast, Comparative Example 1 shows that when no protective layer is formed, the abrasion resistance is poor. Comparative Example 2 shows that even if a protective layer is formed, the initial gas permeation performance is poor if a nonporous layer is used in place of a porous layer.

Examples 101 to 109

Fabrication of Module

The protective-layer-covered gas separation membranes fabricated in Examples 1 to 9 were used to fabricate spiral modules in accordance with paragraphs [0012] to [0017] of JP1993-168869A (JP-H05-168869A). The resulting gas separation membrane modules were used as gas separation membrane modules of Examples 101 to 109.

The fabricated gas separation membrane modules of Examples 101 to 109 were found to have good performance as did the gas separation membranes built thereinto.

For each of the fabricated gas separation membrane modules of Examples 101 to 109, 1 cm×1 cm pieces were randomly taken at ten points in a 10 cm×10 cm region in the center of one side of the leaf (in a spiral module, a leaf is a portion of the gas separation membrane bent into an envelope shape and having its space on the permeate side connected to a central tube). The element ratios in the surface and in the depth direction were calculated as in Example 1. The calculations demonstrated that the element ratios of the gas separation membrane modules of Examples 101 to 109 matched the element ratios of the gas separation membranes built thereinto at nine or more of the ten points. The spiral modules were also found to have good performance as did the gas separation membranes built thereinto.

REFERENCE SIGNS LIST 1 additional resin layer
2 resin layer precursor containing siloxane bond
3 resin layer containing compound having siloxane bond
4 support (in the second embodiment, the porous support A)
5 surface oxidation treatment
6 surface of resin layer containing compound having siloxane bond
7 plane of resin layer containing compound having siloxane bond at depth d from surface of resin layer containing compound having siloxane bond (toward support (in the second embodiment, the porous support A))
8 protective layer
9 porous layer
10 gas separation membrane
11 polydimethylsiloxane membrane that is not subjected to surface oxidation treatment process
12 polydimethylsiloxane membrane in which oxygen atoms are uniformly introduced in thickness direction
18 protective-layer-covered gas separation membrane
d depth from surface of resin layer containing compound having siloxane bond (toward support (in the second embodiment, the porous support A))

What is claimed is:

1. A protective-layer-covered gas separation membrane comprising:
a gas separation membrane including a resin layer containing a compound having a siloxane bond;
a protective layer located on the resin layer; and
a porous layer on the protective layer,
wherein the protective layer includes a region PLi present in the porous layer and a region PLe present on the porous layer, and
a degree of infiltration of the protective layer into the porous layer is 10% to 90%, the degree of infiltration being expressed by the following formula:

degree of infiltration of protective layer into porous layer=100%×(thickness of $PLi$)/(thickness of $PLi$+thickness of $PLe$), wherein the porous layer has a carbon dioxide permeability coefficient of 2,000 barrers or more, and
wherein the gas separation membrane satisfies one of conditions 1, 3, and 4:
condition 1: the resin layer satisfies inequalities 1 and 2:
inequality 1: 0.9≥A/B≥0.55
inequality 2: B≥1.7
wherein A represents an O/Si ratio that is a ratio of the number of oxygen atoms to the number of silicon atoms contained in the resin layer at a depth of 10 nm from a surface of the resin layer, and B represents an O/Si ratio that is a ratio of the number of oxygen atoms to the number of silicon atoms in the surface of the resin layer;
condition 3: a minimum percentage $Si_0$ of $Si^{2+}$ and $Si^{3+}$ peaks relative to all Si peaks in ESCA depth profiling of the resin layer is 1% to 40%; and
condition 4: a positron lifetime τ3 of a third component formed by implantation of a positron with an energy of 1 keV into the surface of the resin layer is 3.40 to 4.20 ns.

2. The protective-layer-covered gas separation membrane according to claim 1, wherein the gas separation membrane has a porous support A and the resin layer disposed on the porous support A and satisfies condition 2:
condition 2: the compound having a siloxane bond has a repeating unit represented by general formula (2) and a repeating unit represented by general formula (3):

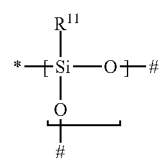

general formula (2)

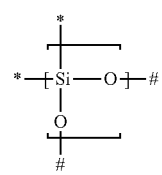

general formula (3)

wherein $R^{11}$ represents a substituent, * represents a site linked to # in general formula (2) or (3), and # represents a site linked to * in general formula (2) or (3),
the gas separation membrane includes a region GLi where the compound having a siloxane bond is present in the porous support A and a region GLe where the resin layer is present on the porous support A,
GLe has a thickness of 50 to 1,000 nm, GLi has a thickness of 20 nm or more, and the thickness of GLi is 10% to 350% of the thickness of GLe, and a difference between a content of the repeating unit represented by general formula (3) in a surface layer of GLe extending to a depth of 20 nm and a content of the repeating unit represented by general formula (3) in a surface layer of GLi extending to a depth of 20 nm is 30% to 90%.

3. The protective-layer-covered gas separation membrane according to claim 1, wherein the protective layer contains a silicone resin.

4. The protective-layer-covered gas separation membrane according to claim 2, wherein the protective layer contains a silicone resin.

5. The protective-layer-covered gas separation membrane according to claim 3, wherein the silicone resin contains a $Si^{4+}$ component.

6. The protective-layer-covered gas separation membrane according to claim 1, wherein the protective layer has a thickness of 200 to 3,000 nm.

7. The protective-layer-covered gas separation membrane according to claim 1, wherein the resin layer of the gas separation membrane and the protective layer are adjacent to each other.

8. A method for producing the protective-layer-covered gas separation membrane according to claim 1, the method comprising:

laminating a layered body of the porous layer and the protective layer to the resin layer of the gas separation membrane.

9. A gas separation membrane module comprising the protective-layer-covered gas separation membrane according to claim 1.

10. A gas separation apparatus comprising the gas separation membrane module according to claim 9.

* * * * *